(12) United States Patent
Zhang et al.

(10) Patent No.: US 11,968,549 B2
(45) Date of Patent: Apr. 23, 2024

(54) INFORMATION DETERMINATION METHOD AND SIGNAL RECEIVING METHOD AND APPARATUS

(71) Applicant: ZTE CORPORATION, Guangdong (CN)

(72) Inventors: Shujuan Zhang, Shenzhen (CN); Zhaohua Lu, Shenzhen (CN); Bo Gao, Shenzhen (CN); Yu Ngok Li, Shenzhen (CN); Chuangxin Jiang, Shenzhen (CN); Zhen He, Shenzhen (CN); Huahua Xiao, Shenzhen (CN); Wenjun Yan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 475 days.

(21) Appl. No.: 17/214,037

(22) Filed: Mar. 26, 2021

(65) Prior Publication Data

US 2021/0337406 A1 Oct. 28, 2021

Related U.S. Application Data

(63) Continuation of application No. PCT/CN2019/108935, filed on Sep. 29, 2019.

(30) Foreign Application Priority Data

Sep. 28, 2018 (CN) .......................... 201811143346.1

(51) Int. Cl.
*H04W 24/08* (2009.01)
(52) U.S. Cl.
CPC .................................. *H04W 24/08* (2013.01)

(58) Field of Classification Search
CPC ...... H04W 24/08; H04L 5/001; H04L 5/0048; H04L 5/0087; H04L 5/0091; H04L 27/261; H04L 5/0023; H04L 5/0053
See application file for complete search history.

(56) References Cited

U.S. PATENT DOCUMENTS

| 2018/0278314 | A1 | 9/2018 | Nam et al. | |
| 2019/0174466 | A1* | 6/2019 | Zhang | H04L 5/0057 |
| 2019/0229792 | A1* | 7/2019 | John Wilson | H04W 72/23 |

(Continued)

FOREIGN PATENT DOCUMENTS

| CN | 108093480 A | 5/2018 |
| CN | 108199819 A | 6/2018 |

(Continued)

OTHER PUBLICATIONS

Media Tek, "Summary #2 for TRS", May 21-25, 2018, 3GPP TSG-RAN WG1 Meeting #93 Busan Korea, R1-1807798 (Year: 2018).*

(Continued)

*Primary Examiner* — Michael K Phillips
(74) *Attorney, Agent, or Firm* — Foley & Lardner LLP

(57) ABSTRACT

Provided are an information determination method and apparatus, a signal reception method and apparatus and a signal transmission method and apparatus. The information determination method includes determining quasi-co-location reference signal information about an aperiodic measurement reference signal resource according to at least one of a relationship between a first threshold and a time interval, whether an intersection is null, or a time offset or a predetermined rule.

12 Claims, 6 Drawing Sheets

(56) References Cited

U.S. PATENT DOCUMENTS

2019/0312621 A1* 10/2019 Nam ............... H04W 72/23
2019/0349964 A1* 11/2019 Liou ............... H04W 76/27

FOREIGN PATENT DOCUMENTS

| EP | 2 905 910 A1 | 8/2015 |
|----|--------------|--------|
| WO | WO-2017/173388 A1 | 10/2017 |
| WO | WO-2018/063065 A1 | 4/2018 |
| WO | WO-2019/147631 A1 | 8/2019 |

OTHER PUBLICATIONS

International Search Report and Written Opinion for PCT Appl. No. PCT/CN2019/108935 dated Jan. 2, 2020 (with English translation, 11 pages).
Samsung: "Discussion on CSI-RS Resource Activation" 3GPP TSG RAN WG1 NR-AH3; R1-1715943; Sep. 21, 2017; Nagoya, Japan (5 pages).
Extended EP Search Report on EP 19864529.3 dated Jun. 13, 2022 (10 pages).
First Examination Report for AU Appl. No. 2019345821, dated Apr. 11, 2022 (6 pages).
First Examination Report for IN Appl. No. 202127019456, dated Mar. 24, 2022 (6 pages).
Nokia et al., "Summary of QCL" 3GPP TSG RAN WG1 Meeting AH 1801, R1-1801054, Jan. 26, 2018, Vancouver, Canada (25 pages).

* cited by examiner

Determine quasi-co-location reference signal information of an aperiodic measurement reference signal resource according to first information, where the first information includes at least one of: a relationship between a first threshold and a time interval, whether an intersection is null, a time offset or a predetermined rule — S202

US 11,968,549 B2

INFORMATION DETERMINATION METHOD AND SIGNAL RECEIVING METHOD AND APPARATUS

CROSS-REFERENCE TO RELATED APPLICATIONS

This application claims the benefit of priority under 35 U.S.C. § 120 as a continuation of PCT Patent Application No. PCT/CN2019/108935, filed on Sep. 29, 2019, which claims priority to Chinese Patent Application No. 201811143346.1 filed on Sep. 28, 2018, the disclosure of each of which is incorporated herein by reference in its entirety.

TECHNICAL FIELD

The present disclosure relates to the field of communication, for example, an information determination method and apparatus, a signal reception method and apparatus, a signal transmission method and apparatus, a storage medium and an electronic apparatus.

BACKGROUND

An aperiodic measurement reference signal is triggered by downlink control information (DCI). In a communication system based on radio beams, the aperiodic measurement reference signal needs to be received by using a suitable receive beam. A certain time interval is required between the time when a terminal decodes the DCI and the time when the receive beam indicated by the DCI is used to receive an aperiodic-channel state information-reference signal (AP-CSI-RS). The receive beam of the aperiodic measurement reference signal cannot be determined when the time interval between the DCI and the aperiodic measurement reference signal is less than a target time interval.

On the other hand, many channel state information-reference signal (CSI-RS) resources exist in new radio (NR), and the signaling overhead for notifying the aperiodic measurement reference signal is large, causing a large system load. Moreover, some parameter configurations of the aperiodic measurement reference signal are unreasonable and unclear, making the system unable to run and causing confusion in the understanding of the terminal.

SUMMARY

The embodiments of the present disclosure provide an information determination method and apparatus and a signal reception method and apparatus so as to solve at least the problem in the related art that the receive beam of the aperiodic measurement reference signal cannot be determined when the time interval between the DCI and the aperiodic measurement reference signal is less than a target time interval.

An information determination method is provided according to an embodiment of the present disclosure. The method includes determining quasi-co-location reference signal information of an aperiodic measurement reference signal resource according to first information. The first information includes at least one of: a relationship between a first threshold and a time interval, whether an intersection is null, a time offset or a predetermined rule. The time interval includes one of a time interval between control information scheduling the aperiodic measurement reference signal resource and the aperiodic measurement reference signal resource or a time interval between control information scheduling the aperiodic measurement reference signal resource and an aperiodic measurement reference signal resource set including the aperiodic measurement reference signal resource. The intersection is an intersection of a first time domain symbol set and a second time domain symbol set, and the first time domain symbol set includes one of a time domain symbol set where the aperiodic measurement reference signal resource is located or a time domain symbol set where the aperiodic measurement reference signal resource set including the aperiodic measurement reference signal resource is located. The second time domain symbol set is a time domain symbol set where a target channel or a target signal is located. The time offset is a time offset associated with the aperiodic measurement reference signal resource set including the aperiodic measurement reference signal resource.

An information determination apparatus is provided according to another embodiment of the present disclosure. The apparatus includes a first determination module configured to determine quasi-co-location reference signal information of an aperiodic measurement reference signal resource according to first information. The first information includes at least one of a relationship between a first threshold and a time interval, whether an intersection is null, a time offset or a predetermined rule. The time interval includes one of a time interval between control information scheduling the aperiodic measurement reference signal resource and the aperiodic measurement reference signal resource or a time interval between control information scheduling the aperiodic measurement reference signal resource and an aperiodic measurement reference signal resource set including the aperiodic measurement reference signal resource. The intersection is an intersection of a first time domain symbol set and a second time domain symbol set, and the first time domain symbol set includes one of a time domain symbol set where the aperiodic measurement reference signal resource is located or a time domain symbol set where the aperiodic measurement reference signal resource set including the aperiodic measurement reference signal resource is located. The second time domain symbol set is a time domain symbol set where a target channel or a target signal is located. The time offset is a time offset associated with the aperiodic measurement reference signal resource set including the aperiodic measurement reference signal resource.

A signal reception method is provided according to another embodiment of the present disclosure. The method includes determining parameter information of a measurement reference signal according to a predetermined rule and receiving the measurement reference signal according to the determined parameter information.

A signal reception apparatus is provided according to another embodiment of the present disclosure. The apparatus includes a determination module configured to determine parameter information of a measurement reference signal according to a predetermined rule and a reception module configured to receive the measurement reference signal according to the determined parameter information.

A signal transmission method is provided according to another embodiment of the present disclosure. The method includes: determining at least one of one downlink reference signal group or one time advance information group corresponding to each type of uplink signal among E types of uplink signals included in one uplink component carrier, where the E types of uplink signals correspond to at least one of E downlink reference signal groups or E time advance information groups, and E is a positive integer greater than or equal to 1; and transmitting at least one type of uplink signal among the E types of uplink signals according to at least one of the determined one downlink reference signal group or the determined one time advance information group.

A signal transmission apparatus is provided according to another embodiment of the present disclosure. The apparatus includes a first determination module and a transmission module. The first determination module is configured to determine at least one of one downlink reference signal group or one time advance information group corresponding to each type of uplink signal among E types of uplink signals included in one uplink component carrier, where the E types of uplink signals correspond to at least one of E downlink reference signal groups or E time advance information groups, and E is a positive integer greater than or equal to 1. The transmission module is configured to transmit at least one type of uplink signal among the E types of uplink signals according to at least one of the determined one downlink reference signal group or the determined one time advance information group.

A storage medium is further provided according to another embodiment of the present disclosure and stores a computer program. When the computer program is executed, the steps in any one of the preceding method embodiments are performed.

An electronic apparatus is further provided according to another embodiment of the present disclosure. The electronic apparatus includes a memory and a processor. The memory stores a computer program, and the processor is configured to execute the computer program to perform the steps in any one of the preceding method embodiments.

According to the present disclosure, the quasi-co-location reference signal information of an aperiodic measurement reference signal resource is determined according to at least one of the relationship between a first threshold and a time interval, whether the intersection is null, the time offset or the predetermined rule, and the receive beam can be obtained according to the determined quasi-co-location reference signal rather than according to the quasi-co-location reference signal indicated in DCI. Therefore, the receive beam of the aperiodic measurement reference signal can be determined when the time interval between the DCI and the aperiodic measurement reference signal is less than the target time interval, solving the technical problem in the related art that the receive beam of the aperiodic measurement reference signal cannot be determined when the time interval between the DCI and the aperiodic measurement reference signal is less than the target time interval, and achieving the technical effect of improving the reception accuracy of the aperiodic measurement reference signal.

DETAILED DESCRIPTION

The present disclosure will be hereinafter described in detail with reference to drawings in conjunction with embodiments. It is to be noted that if not in collision, the embodiments and features therein hereinafter may be combined with each other.

It is to be noted that the terms "first", "second" and the like in the description, claims and the preceding drawings of the present disclosure are used to distinguish between similar objects but not necessarily used to describe a particular order or sequence.

Embodiment One

Figures 1, 2:
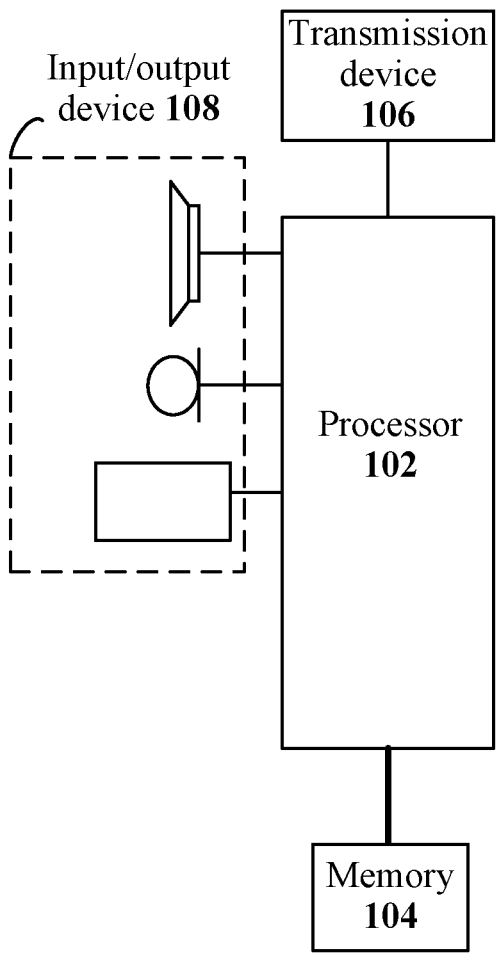
FIG. 1 is a block diagram showing structures illustrating hardware structures of a mobile terminal for an information determination method according to an embodiment of the present disclosure.
FIG. 2 is a flowchart of an information determination method according to an embodiment of the present disclosure.

The method embodiment provided in embodiment one of the present application may be performed in a mobile terminal, a computer terminal or other similar computing apparatuses. Using an example in which the method is to be executed in the mobile terminal for illustration, FIG. 1 is a block diagram showing structures illustrating hardware of a mobile terminal for an information determination method according to an embodiment of the present disclosure. As shown in FIG. 1, a mobile terminal 10 may include one or more (merely one is shown in FIG. 1) processors 102 (the processors 102 may include, but are not limited to, a microprocessor such as a microcontroller unit (MCU), a programmable logic device such as a field-programmable gate array (FPGA), and other processing apparatuses), and a memory 104 used for storing data. The preceding mobile terminal may further include a transmission device 106 for a communication function and an input/output device 108. It is to be understood by those having ordinary skill in the art that the structure shown in FIG. 1 is merely illustrative and not intended to limit the structure of the preceding mobile terminal. For example, the mobile terminal 10 may further include more or fewer components than the components shown in FIG. 1 or may have a configuration different from the configuration shown in FIG. 1.

The memory 104 may be configured to store a computer program such as a software program and a module of application software, for example, the computer program corresponding to the information determination method in the embodiment of the present disclosure. The processor 102 executes the computer program stored in the memory 104 to perform various functional applications and data processing, that is, to implement the preceding method. The memory 104 may include a high-speed random access memory and may further include a nonvolatile memory such as one or more magnetic storage apparatuses, flash memories or other nonvolatile solid-state memories. In some examples, the memory 104 may include memories which are remotely disposed with respect to the processor 102 and these remote memories may be connected to the mobile terminal 10 via a network. The examples of the preceding network include, but are not limited to, the Internet, an intranet, a local area network, a mobile communication network and a combination thereof.

The transmission device 106 is configured to receive or transmit data via a network. Specific examples of such a network described above may include a wireless network provided by a communication provider of the mobile terminal 10. In one example, the transmission device 106 includes a network interface controller (NIC) which may be connected to other network devices via a base station and thus is capable of communicating with the Internet. In one example, the transmission device 106 may be a radio frequency (RF) module which is used for communicating with the Internet in a wireless manner.

The embodiment provides an information determination method executed on the preceding mobile terminal. FIG. 2 is a flowchart of an information determination method according to an embodiment of the present disclosure. As shown in FIG. 2, the method includes the step described below.

In step S202, quasi-co-location reference signal information of an aperiodic measurement reference signal resource is determined according to first information, where the first information includes at least one of: a relationship between a first threshold and a time interval, whether an intersection is null, a time offset or a predetermined rule.

The time interval includes one of: a time interval between control information scheduling the aperiodic measurement reference signal resource and the aperiodic measurement reference signal resource or a time interval between control information scheduling the aperiodic measurement reference signal resource and an aperiodic measurement reference signal resource set including the aperiodic measurement reference signal resource.

The intersection is an intersection of a first time domain symbol set and a second time domain symbol set. The first time domain symbol set includes one of: a time domain symbol set where the aperiodic measurement reference signal resource is located or a time domain symbol set where the aperiodic measurement reference signal resource set including the aperiodic measurement reference signal resource is located. The second time domain symbol set is a time domain symbol set where a target channel or a target signal is located.

The time offset is a time offset associated with the aperiodic measurement reference signal resource set including the aperiodic measurement reference signal resource.

According to the preceding steps, quasi-co-location reference signal information of an aperiodic measurement reference signal resource is determined according to at least one of the relationship between a first threshold and a time interval, whether the intersection is null, the time offset or the predetermined rule, and the receive beam can be obtained according to the determined quasi-co-location reference signal, solving the problem in the related art that the receive beam of the aperiodic measurement reference signal cannot be determined when the time interval between the DCI and the aperiodic measurement reference signal is less than a time interval, and achieving the technical effect of improving the reception accuracy of the aperiodic measurement reference signal.

The preceding step may, but may not necessarily, be executed by a terminal.

The aperiodic measurement reference signal resource is used for carrying an aperiodic measurement reference signal. One aperiodic measurement reference signal resource may belong to one aperiodic measurement reference signal resource set. The quasi-co-location reference signal is used for indicating the receive beam for receiving the aperiodic measurement reference signal.

In the embodiment, the quasi-co-location reference signal information of the aperiodic measurement reference signal resource may be determined according to the first information in various manners.

The step of determining the quasi-co-location reference signal information of the aperiodic measurement reference signal resource according to the first information includes: in response to the first information satisfying a predetermined condition, determining the quasi-co-location reference signal information of the aperiodic measurement reference signal resource according to a first predetermined rule. The first predetermined rule includes at least one of the rules described below.

Aperiodic measurement reference signal resources in one aperiodic measurement reference signal resource set share a quasi-co-location reference signal.

Aperiodic measurement reference signal resources in one aperiodic measurement reference signal resource set satisfy a quasi-co-location relationship.

Aperiodic measurement reference signal resources in one time unit share a quasi-co-location reference signal.

Aperiodic measurement reference signal resources in one time unit satisfy a quasi-co-location relationship.

A quasi-co-location reference signal of the aperiodic measurement reference signal resource is acquired according to a quasi-co-location reference signal of a control resource satisfying a second predetermined characteristic in a time domain symbol, where the time domain symbol includes one of: a time domain symbol closest to the aperiodic measurement reference signal resource among time domain symbols where a control resource satisfying a first predetermined characteristic is included or a time domain symbol closest to the aperiodic measurement reference signal resource set including the aperiodic measurement reference signal resource among time domain symbols where a control resource satisfying a first predetermined characteristic is included.

A quasi-co-location reference signal of the aperiodic measurement reference signal resource is acquired according to a quasi-co-location reference signal of a control resource satisfying a second predetermined characteristic in a time unit, where the time unit includes one of: a time unit closest to the aperiodic measurement reference signal resource among time units where a control resource satisfying a first predetermined characteristic is included or a time unit closest to the aperiodic measurement reference signal resource set including the aperiodic measurement reference signal resource among time units where a control resource satisfying a first predetermined characteristic is included.

Quasi-co-location reference signals of M aperiodic measurement reference signal resource groups are acquired according to quasi-co-location reference signals of M control resources. Where M is a positive integer greater than or equal to 1, the M aperiodic measurement reference signal resource groups belong to one time unit, and at least one aperiodic measurement reference signal resource group among the M aperiodic measurement reference signal resource groups includes the aperiodic measurement reference signal resource.

The time domain symbol closest to the aperiodic measurement reference signal resource is the time domain symbol closest to the first time domain symbol of the aperiodic measurement reference signal resource. For example, if an aperiodic measurement reference signal resource occupies time domain symbols {3, 8} in a slot, the time domain symbol closest to the aperiodic measurement reference signal resource is the time domain symbol closest to time domain symbol 3.

The predetermined condition includes one of the following:
the time interval is less than the first threshold;
the intersection is not null;
the time interval is less than the first threshold and the intersection is not null; or
a time unit where the aperiodic measurement reference signal resource is located is in a predetermined time unit set.

The step in which the quasi-co-location reference signals of the M aperiodic measurement reference signal resource groups is acquired according to the quasi-co-location reference signals of the M control resources includes at least one of the following:
the M control resources are M control resources satisfying the second predetermined characteristic in L time units closest to at least one aperiodic measurement reference signal resource group among the M aperiodic measurement reference signal resource groups in a time unit set where the control resource satisfying the first predetermined characteristic is included, where L is a positive integer less than or equal to M;
the M control resources are M control resources satisfying the second predetermined characteristic in L time domain symbols closest to at least one aperiodic measurement reference signal resource group among the M aperiodic measurement reference signal resource groups in a time domain symbol set where the control resource satisfying the first predetermined characteristic is included, where L is a positive integer less than or equal to M;
the M aperiodic measurement reference signal resource groups belong to one aperiodic measurement reference signal set;
the M aperiodic measurement reference signal resource groups are M aperiodic measurement reference signal sets;
an intersection of time domain symbols occupied by the M aperiodic measurement reference signal resource groups is not null;
an intersection of time domain symbols occupied by the M control resources exists;
quasi-co-location reference signals of the M control resources with respect to a spatial Rx filtering parameter belong to one group; or
a communication node is capable of simultaneously generating quasi-co-location reference signals of the M control resources with respect to a spatial Rx filtering parameter,
where the communication node is a communication node receiving an aperiodic measurement reference signal carried by the aperiodic measurement reference signal resource.

In the embodiment, the first information may include at least one of a relationship between a first threshold and a time interval, whether an intersection is null, a time offset or a predetermined rule.

The time interval comprises one of: a time interval between control information scheduling the aperiodic measurement reference signal resource and the aperiodic measurement reference signal resource or a time interval between control information scheduling the aperiodic measurement reference signal resource and an aperiodic measurement reference signal resource set including the aperiodic measurement reference signal resource. The first threshold is a preset value and may be set according to experience or a control instruction (higher-layer instruction). The specific setting method is not limited in the embodiment.

The time interval may include one of the following:
a time interval between the control information scheduling the aperiodic measurement reference signal resource and a first time domain symbol of the aperiodic measurement reference signal resource;
a time unit offset between the control information scheduling the aperiodic measurement reference signal and a first time domain symbol of the aperiodic measurement reference signal resource;
a time interval between the control information scheduling the aperiodic measurement reference signal and a first time domain symbol included in the aperiodic measurement reference signal resource set including the aperiodic measurement reference signal resource; or
a time unit offset between the control information scheduling the aperiodic measurement reference signal and the aperiodic measurement reference signal resource set including the aperiodic measurement reference signal resource.

In an embodiment, the time interval is less than the first threshold.

The intersection may be an intersection of a time domain symbol set where the aperiodic measurement reference signal resource is located and the time domain symbol set where a target channel or target symbol is located and may be an intersection of a time domain symbol set where the aperiodic measurement reference signal resource set including the aperiodic measurement reference signal resource is located and the time domain symbol set where a target channel or target symbol is located.

The target channel includes at least one of: a data channel or a control channel. The target signal includes at least one of: a demodulation reference signal, a measurement reference signal or a synchronization signal. A time interval between the target channel or the target signal and control information scheduling the target channel or the target signal is greater than or equal to a second threshold.

The time offset is a time offset associated with the aperiodic measurement reference signal resource set including the aperiodic measurement reference signal resource.

The quasi-co-location reference signal information is determined in different manners according to different first information. The quasi-co-location reference signal information may be determined in many different manners or combinations.

For example, when the first information includes the relationship between the first threshold and the time interval, the step of determining the quasi-co-location reference signal information of the aperiodic measurement reference signal resource according to the first information may include determining the quasi-co-location reference signal information of the aperiodic measurement reference signal resource according to the relationship between the first threshold and the time interval and according to a target rule. The target rule includes at least one of the rules described below.

When the time interval is less than a target time threshold, all the measurement reference signal resources in an aperiodic measurement reference signal resource set satisfy a quasi-co-location relationship with respect to a type of quasi-co-location parameter.

When the time interval is less than the first threshold, quasi-co-location reference signals of all the measurement reference signal resources in an aperiodic measurement reference signal resource set are the same with respect to a type of quasi-co-location parameter.

When the time interval is less than the first threshold, all the measurement reference signal resources in the time unit where the aperiodic measurement reference signal resource is located satisfy a quasi-co-location relationship with respect to a type of quasi-co-location parameter.

When the time interval is less than the first threshold, quasi-co-location reference signals of all the measurement reference signal resources in the time unit where the aperiodic measurement reference signal resource is located are the same with respect to a type of quasi-co-location parameter.

When the time interval is greater than or equal to the first threshold, each measurement reference signal resource in the aperiodic measurement reference signal resource set including the aperiodic measurement reference signal resource corresponds to one quasi-co-location reference signal separately.

When the time interval is greater than or equal to the first threshold, aperiodic measurement reference signal resources in the aperiodic measurement reference signal resource set including the aperiodic measurement reference signal resource are not required to satisfy a quasi-co-location relationship.

When the time interval is greater than or equal to the first threshold, each measurement reference signal resource in the time unit where the aperiodic measurement reference signal resource is located corresponds to one quasi-co-location reference signal separately.

When the time interval is greater than or equal to the first threshold, aperiodic measurement reference signal resources in the time unit where the aperiodic measurement reference signal resource is located are not required to satisfy a quasi-co-location relationship.

In an embodiment, a time unit is a slot, and the quasi-co-location reference signal of the aperiodic measurement reference signal indicates that the aperiodic measurement reference signal and the quasi-co-location reference signal satisfy a quasi-co-location relationship with respect to a type of quasi-co-location parameter, where the type of quasi-co-location parameter includes a spatial Rx parameter.

The type of quasi-co-location parameter includes at least one of: Doppler shift, Doppler spread, average delay, delay spread, an average gain or the spatial Rx parameter.

The quasi-co-location reference signal of one signal being acquired according to the quasi-co-location reference signal of another signal indicates that part or all of the quasi-co-location reference signals of one signal are acquired according to part or all of the quasi-co-location reference signals of another signal. For example, each signal is associated with two quasi-co-location reference signals, and different quasi-co-location reference signals are associated with different quasi-co-location parameter sets. In one case, both quasi-co-location parameters of one signal are acquired according to the quasi-co-location reference signals of another signal. In another case, one of the quasi-co-location parameters of one signal is acquired according to one quasi-co-location reference signal of another signal.

Before the quasi-co-location reference signal information of an aperiodic measurement reference signal resource is determined according to first information, the first threshold may also be determined according to second information. The second information includes at least one of the following:

signaling information which includes information about the first threshold;

first capability information reported by a communication node, where the first capability information is used for indicating a minimum time interval required by the communication node to detect and apply spatial domain quasi-co-location reference signal information indicated in the physical layer control information for receiving a data channel;

second capability information reported by a communication node, where the second capability information is used for indicating a minimum time interval required by the communication node between a time of physical layer control information and a time when a spatial Rx filtering parameter corresponding to quasi-co-location reference signal information indicated in the physical layer control information is used to receive an aperiodic measurement reference signal;

third capability information reported by a communication node, where the third capability information is used for indicating: in a case where an aperiodic measurement reference signal is received by using an inactive antenna, a minimum time interval required by the communication node from a time when the communication node detects physical layer control information to a time when a spatial Rx filtering parameter corresponding to quasi-co-location reference signal information indicated in the physical layer control information is used to receive the aperiodic measurement reference signal;

fourth capability information reported by a communication node, where the fourth capability information is used for indicating: when the communication node receives an aperiodic measurement reference signal, a minimum time interval between the aperiodic measurement reference signal and physical layer control information scheduling the aperiodic measurement reference signal;

whether a value of fifth capability information reported by a communication node belongs to a predetermined set, where the fifth capability information includes one of second capability information, third capability information or fourth capability information;

information about an activation state of a receive antenna of a communication node;

information about a reception parameter associated with the aperiodic measurement reference signal resource;

group information associated with the aperiodic measurement reference signal resource;

whether the intersection is null;

whether a time resource occupied by the aperiodic measurement reference signal resource is in an active state in a discontinuous reception period;

information about an activation state of a receive antenna associated with the aperiodic measurement reference signal resource;

whether a data channel exists in a time domain symbol or at a time moment where the aperiodic measurement reference signal resource is located;

configuration information of the aperiodic measurement reference signal set where the aperiodic measurement reference signal resource is located;

set index information of the aperiodic measurement reference signal set where the aperiodic measurement reference signal resource is located; or resource index information of the aperiodic measurement reference signal resource.

The communication node is a reception node of an aperiodic measurement reference signal carried by the aperiodic measurement reference signal resource.

The data channel includes a potential data channel or an already scheduled data channel. For the potential data channel, the interval between the control information scheduling the data channel and the data channel is less than the second threshold.

The first threshold has a first characteristic, and the first characteristic includes at least one of the following:

the first threshold is configured in an aperiodic measurement reference signal resource set;

at least two aperiodic measurement reference signal sets exist, where two aperiodic measurement reference signal sets correspond to different first thresholds;

in a case where the intersection is null, the first threshold is a first value;

in a case where the intersection is not null, the first threshold is a second value;

the first threshold is acquired according to parameter information associated with the aperiodic measurement reference signal resource, where the parameter information includes at least one of: quasi-co-location reference signal information of the aperiodic measurement reference signal resource or a configuration situation (e.g. repetition information) of a spatial transmission filtering parameter in the aperiodic measurement reference signal resource set including the aperiodic measurement reference signal resource;

in a case where the value of the fifth capability information reported by the communication node belongs to the predetermined set, the first threshold is the value of the fifth capability information reported by the communication node; or in a case where the value of the fifth capability information reported by the communication node does not belong to the predetermined set, the first threshold is a value of the first capability information reported by the communication node.

The first value and the second value satisfy one of the following: the first value and the second value are two different values or the first value is less than the second value. The predetermined set includes time intervals of {14 time domain symbols, 28 time domain symbols, 48 time domain symbols}.

The step in which the measurement reference signal resources in the one aperiodic measurement reference signal resource set share the quasi-co-location reference signal includes at least one of the steps described below.

The shared quasi-co-location reference signal is acquired according to a set index of the one aperiodic measurement reference signal set.

The shared quasi-co-location reference signal is acquired according to a quasi-co-location reference signal configured in the one aperiodic measurement reference signal resource set.

The shared quasi-co-location reference signal is acquired according to a quasi-co-location reference signal of a control resource, where the control resource is obtained according to a predetermined rule.

The shared quasi-co-location reference signal is acquired according to a quasi-co-location reference signal of a predetermined aperiodic measurement reference signal resource in the one aperiodic measurement reference signal resource set.

In another implementation, in a case where the first information includes whether the intersection is null, the step of determining the quasi-co-location reference signal information of the aperiodic measurement reference signal resource according to the first information may include the steps described below.

(1) In response to the intersection being not null, the quasi-co-location reference signal information of the aperiodic measurement reference signal resource is determined according to a second predetermined rule. The second predetermined rule includes at least one of the rules described below.

Measurement reference signal resources in the aperiodic measurement reference signal resource set including the aperiodic measurement reference signal resource share a quasi-co-location reference signal.

Measurement reference signal resources in the aperiodic measurement reference signal resource set including the aperiodic measurement reference signal resource satisfy a quasi-co-location relationship.

Aperiodic measurement reference signal resources in a time unit where the aperiodic measurement reference signal resource is located share a quasi-co-location reference signal set.

Aperiodic measurement reference signal resources in a time unit where the aperiodic measurement reference signal resource is located satisfy a quasi-co-location relationship.

Whether a quasi-co-location reference signal of the aperiodic measurement reference signal resource is acquired according to a quasi-co-location reference signal of a control resource satisfying a second predetermined characteristic in a time unit, where the time unit includes one of: a time unit closest to the aperiodic measurement reference signal resource among time units where a control resource satisfying a first predetermined characteristic exists or a time unit closest to the aperiodic measurement reference signal resource set including the aperiodic measurement reference signal resource among time units where a control resource satisfying a first predetermined characteristic exists.

(2) In response to the intersection being null, the quasi-co-location reference signal information of the aperiodic measurement reference signal resource is determined according to a third predetermined rule. The third predetermined rule includes at least one of the rules described below.

Measurement reference signal resources in the aperiodic measurement reference signal resource set including the aperiodic measurement reference signal resource do not share a quasi-co-location reference signal.

Measurement reference signal resources in the aperiodic measurement reference signal resource set including the aperiodic measurement reference signal resource are not required to satisfy a quasi-co-location relationship.

Aperiodic measurement reference signal resources in a time unit where the aperiodic measurement reference signal resource is located do not share a quasi-co-location reference signal set.

Aperiodic measurement reference signal resources in a time unit where the aperiodic measurement reference signal resource is located are not required to satisfy a quasi-co-location relationship.

A quasi-co-location reference signal of the aperiodic measurement reference signal resource is acquired according to a quasi-co-location reference signal of a control resource satisfying a second predetermined characteristic in a time domain symbol, where the time domain symbol includes one of: a time domain symbol closest to the aperiodic measurement reference signal resource among time domain symbols where a control resource satisfying a first predetermined characteristic exists or a time domain symbol closest to the aperiodic measurement reference signal resource set including the aperiodic measurement reference signal resource among time domain symbols where a control resource satisfying a first predetermined characteristic exists.

In another implementation, in a case where the first information includes the time offset, the step of determining the quasi-co-location reference signal information of the aperiodic measurement reference signal resource according to the first information may include the steps described below.

The quasi-co-location reference signal information of the aperiodic measurement reference signal resource is determined according to the time offset and a fourth predetermined rule. The fourth predetermined rule includes at least one of the rules described below.

In a case where C aperiodic measurement reference signal resource sets correspond to a same time offset, quasi-co-location reference signals of one aperiodic measurement reference signal resource index in the C aperiodic reference signal sets are the same.

In a case where C aperiodic measurement reference signal resource sets correspond to a same time offset, quasi-co-location reference signals of one aperiodic measurement reference signal resource index in C aperiodic reference signal sets satisfy a quasi-co-location relationship.

In a case where C aperiodic measurement reference signal resource sets correspond to a same time offset, one aperiodic measurement reference signal resource index is configured with no quasi-co-location reference signal in all of the C aperiodic reference signal sets.

In a case where C aperiodic measurement reference signal resource sets correspond to different time offsets, quasi-co-location reference signals of one aperiodic measurement reference signal resource index in C aperiodic reference signal sets are the same or different.

One aperiodic measurement reference signal resource index is not capable of being configured with more than one set of quasi-co-location reference signals in one trigger state.

One aperiodic measurement reference signal resource index is not capable of being configured with more than one set of quasi-co-location reference signals in one aperiodic measurement reference signal set.

Each of the C aperiodic measurement reference signal resource sets includes the one aperiodic measurement reference signal resource index, and in response to the C aperiodic measurement reference signal resource sets corresponding to one trigger state, C is an integer value greater than 1.

The index of an aperiodic measurement reference signal resource is the same as the aperiodic measurement reference signal resource index.

One set of quasi-co-location reference signals includes one or two quasi-co-location reference signals, each quasi-co-location reference signal is associated with a type of quasi-co-location parameter, and the quasi-co-location parameters associated with two series of quasi-co-location reference signals intersect with each other.

In another implementation, in a case where the first information includes the predetermined rule, the step of determining the quasi-co-location reference signal information of the aperiodic measurement reference signal resource according to the first information may include the steps described below.

The quasi-co-location reference signal information of the aperiodic measurement reference signal resource is determined according to the predetermined rule. The predetermined rule includes at least one of the rules described below.

The time offsets of a plurality of aperiodic measurement reference signal resource sets associated with a same aperiodic measurement reference signal resource index in a same trigger state are the same, and a plurality of quasi-co-location reference signals associated with the same aperiodic measurement reference signal resource index in a plurality of aperiodic measurement reference signal sets are the same.

Quasi-co-location reference signals of a plurality of aperiodic measurement reference signal resources having a same resource index and belonging to a same component carrier at a same time moment have different configurations.

The same time moment may include the same time domain symbol, the same slot or the same subframe.

The information determination method in the embodiment is illustrated in conjunction with the examples described below.

Example One

In a communication system based on radio beams (for example, at high frequency bandwidth, not excluding the case where radio beams may also be used at low frequency bandwidth), when an aperiodic measurement reference signal (for example, AP-CSI-RS) is received, it is necessary to determine the receive beam of the AP-CSI-RS, especially the radio receive beam.

However, from DCI to the AP-CSI-RS, it is necessary to consider the delay of the terminal decoding the DCI and the delay of beam handover. Therefore, for not all the radio frequency receive beams of the AP-CSI-RS, at least one of the receive beam or large-scale information of the AP-CSI- RS can be obtained according to the quasi-co-location reference signal (QCL-RS) of the AP-CSI-RS indicated in the DCI.

Figure 3:
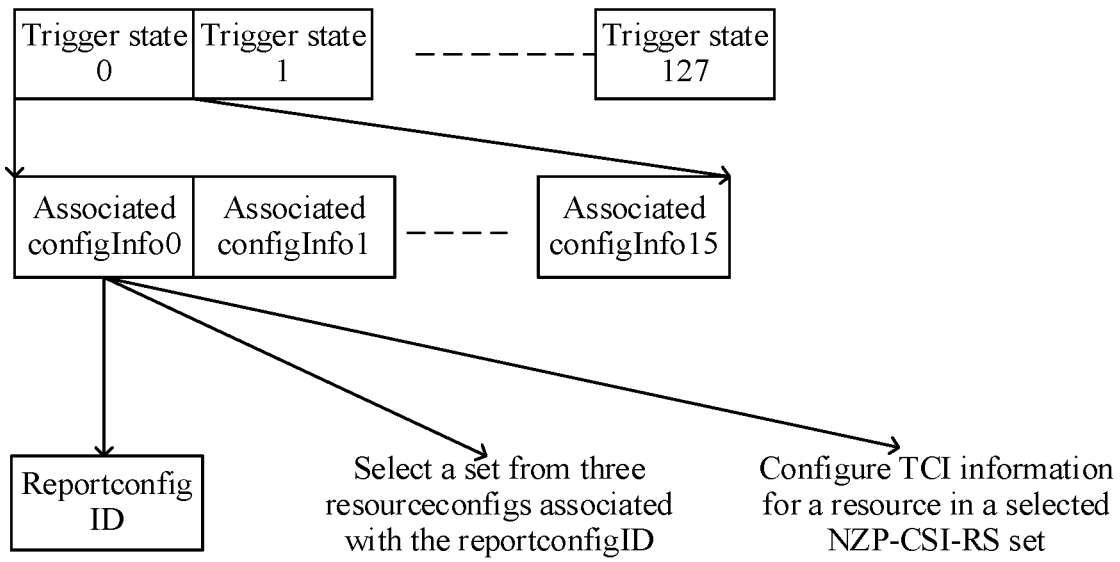
FIG. 3 is a diagram showing a parameter configuration method of an aperiodic measurement reference signal resource according to an embodiment of the present disclosure.

The AP-CSI-RS in new radio (NR) is activated in a manner as shown in FIG. 3. RRC signaling can configure up to 128 trigger states of {trigger state 0 to trigger state 127} in FIG. 3. The CSI request field in the DCI can have six bits at most, and the values {0 to 63} in the six bits correspond to {trigger state 0 to trigger state 63} in FIG. 3 in sequence, and {trigger state 0 to trigger state 63} represents 64 trigger states selected by a medium access control-control element (MAC-CE) command from 128 trigger states configured by radio resource control (RRC). When the value of the CSI request field in the DCI is 3, trigger state 3 is to be triggered. Each trigger state may be associated with up to 16 pieces of associated configuration information (associatedconfigInfo) and each piece of associatedconfigInfo is associated with the following three pieces of information: a report setting, a set selected sequentially from three resource settings associated with the report setting, and transmission configuration indicator (TCI) information configured for each resource in the set for channel. A resource setting is a resourceconfig in FIG. 3. One resource setting may include more than one resource set, and one resource set may include more than one AP-CSI-RS resource. The TCI information of one AP-CSI-RS resource includes one or more quasi-co-location reference signals, and each quasi-co-location reference signal is associated with a type of quasi-co-location parameter, indicating that the AP-CSI-RS resource and the quasi-co-location reference signal satisfy a quasi-co-location relationship with respect to the type of quasi-co-location parameter.

However, when the time interval between the AP-CSI-RS and the DCI that schedules the AP-CSI-RS is less than a first threshold K, the QCL information of the AP-CSI-RS, especially the QCL reference signal information of the spatial Rx parameter associated with the AP-CSI-RS, that is, the radio receive beam information of the AP-CSI-RS, can be determined in at least one of the manners described below.

1) Manner one of acquiring a quasi-co-location reference signal of an aperiodic measurement reference signal is described as below.

Figure 4:
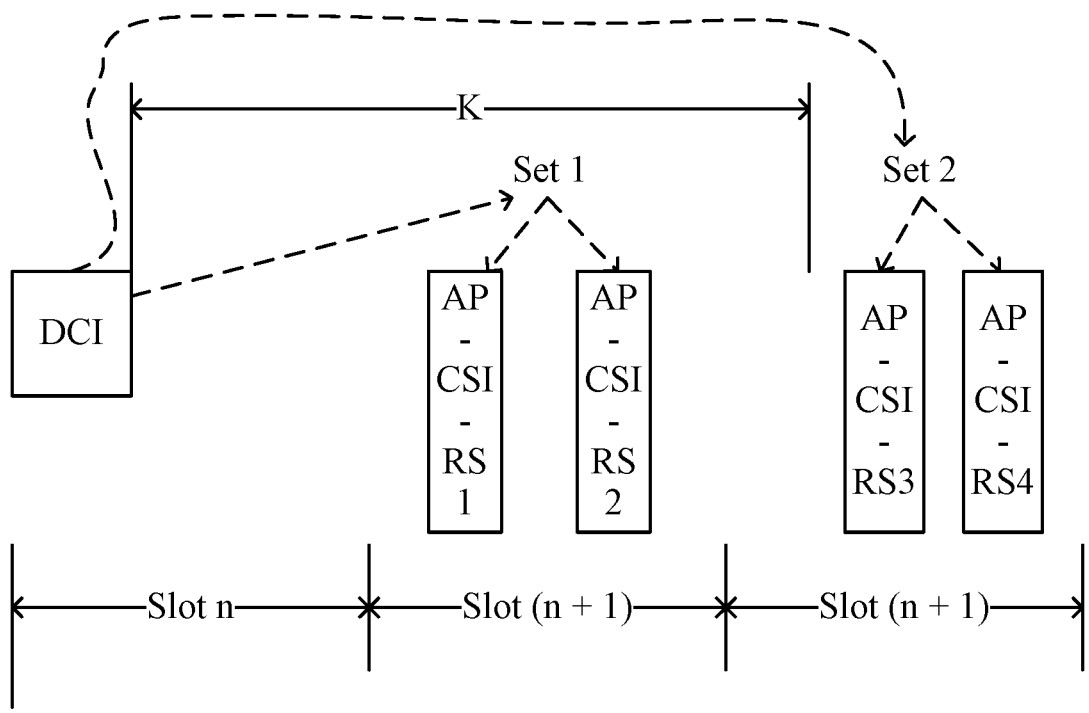
FIG. 4 is a schematic diagram illustrating determination whether AP-CSI-RS resources in an AP-CSI-RS set share a quasi-co-location reference signal according to a time interval between DCI and an AP-CSI-RS according to an embodiment of the present disclosure.

According to the relationship between the time interval between the DCI and the AP-CSI-RS and the first threshold K, it is determined whether the resources in the set share a quasi-co-location reference signal. As shown in FIG. 4, the DCI simultaneously triggers set 1 and set 2 each including two AP-CSI-RSs in the same trigger state. The time interval between set 1 and the DCI is less than the first threshold K, and the time interval between set 2 and the DCI is greater than or equal to the first threshold K. Then, {AP-CSI-RS1, AP-CSI-RS2} in set 1 share a quasi-co-location reference signal, and {AP-CSI-RS3, AP-CSI-RS4} in set 2 do not share a QCL-RS. For resources of {AP-CSI-RS3, AP-CSI-RS4}, the QCL-RSs are acquired according to TCI information configured for AP-CSI-RS3 and AP-CSI-RS4 respectively in the associatedconfig associated with this set in FIG. 3. Alternatively, for {AP-CSI-RS3, AP-CSI-RS4}, the QCL-RSs are acquired according to TCI information configured in respective resource configuration information of non-zero power-channel state information-reference signal-resource (NZP-CSI-RS-Resource) of {AP-CSI-RS3, AP-CSI-RS4}. For specific configuration information, reference may be made to protocols 3GPP TS 38.331 and 38.214.

The {AP-CSI-RS1, AP-CSI-RS2} in set 1 may share the quasi-co-location reference signal in a plurality of manners. One sharing manner is that the QCL-RSs associated with all quasi-co-location parameters of AP-CSI-RS1 and AP-CSI-RS2 are the same, for example, the QCL-RS of AP-CSI-RS1 and AP-CSI-RS2 with respect to {Doppler shift, Doppler spread, average delay, delay spread} is QCL-RS1, and the QCL-RS of AP-CSI-RS1 and AP-CSI-RS2 with respect to {spatial Rx parameter} is QCL-RS2. Another sharing manner is that the QCL-RSs associated with a quasi-co-location parameter of the spatial Rx parameter, of AP-CSI-RS1 and AP-CSI-RS2 are the same (for example, QCL-RS3), and other quasi-co-location parameters of AP-CSI-RS1 are acquired according to the indication in the DCI, for example, the QCL-RS of other quasi-co-location parameters of AP-CSI-RS1 is QCL-RS4. The QCL-RS associated with other quasi-co-location parameters of AP-CSI-RS2 are acquired according to the indication in the DCI, for example, the QCL-RS of other quasi-co-location parameters of AP-CSI-RS2 is QCL-RS5. Other quasi-co-location parameters include at least one of: Doppler shift, Doppler spread, average delay, delay spread or an average gain.

The time interval between the DCI and the AP-CSI-RS may be at least one of the time intervals described below.

(1) Time interval one: time unit offset between the DCI and an AP-CSI-RS set.

The unit of time interval one is a time unit, for example, a slot, that is, the time interval one is an offset configured for an AP-CSI-RS set, where the time unit is a slot. For example, an offset is configured to be 1 in the AP-CSI-RS set, indicating a time offset of one slot between the DCI and the AP-CSI-RS. For example, the DCI is in a time domain symbol k1 in slot n and the AP-CSI-RS is in a time domain symbol k2 in slot (n+1), where k1 and k2 may be any combination without limitation.

(2) Time interval two: time interval between the DCI and the first time domain symbol in an AP-CSI-RS set.

The unit of time interval two is a time domain symbol. As shown in FIG. 4, the last time domain symbol of DCI is time domain symbol 3 in slot n, and the first time domain symbol in AP-CSI-RS set 1 is the first time domain symbol in the set of time domain symbols occupied by all AP-CSI-RS resources included in set 1, that is, the first time domain symbol occupied by AP-CSI-RS1 in slot (n+1), which is time domain symbol 5 in slot (n+1), and then the time interval between DCI and the AP-CSI-RS set is 16 time domain symbols.

(3) Time interval three: time interval between the DCI and the last time domain symbol in an AP-CSI-RS set.

The unit of time interval three is a time domain symbol. As shown in FIG. 4, the last time domain symbol of DCI is time domain symbol 3 in slot n, and the last time domain symbol in AP-CSI-RS set 1 is the last time domain symbol in the set of time domain symbols occupied by all AP-CSI-RS resources included in set 1, that is, the last time domain symbol occupied by AP-CSI-RS2 in slot (n+1), which is time domain symbol 8 in slot (n+1), and then the time interval between DCI and the AP-CSI-RS set is 19 time domain symbols.

(4) Time interval four: interval between the DCI and the first time domain symbol of each AP-CSI-RS resource.

For example, each AP-CSI-RS resource in set 1 occupies merely one time domain symbol, and thus the time interval between DCI and AP-CSI-RS1 is 16 time domain symbols, and the time interval between DCI and AP-CSI-RS2 is 19 time domain symbols. Similarly, time interval four may also be an interval between the DCI and the last time domain symbol of each AP-CSI-RS resource.

QCL-RS1 and QCL-RS2 in sharing manner one or QCL-RS3 in sharing manner two may be referred to default quasi-co-location reference signals. The default quasi-co-location reference signals may be acquired in the manners described below.

(1) Manner One of Acquiring a Default Quasi-Co-Location Reference Signal

Figure 5:
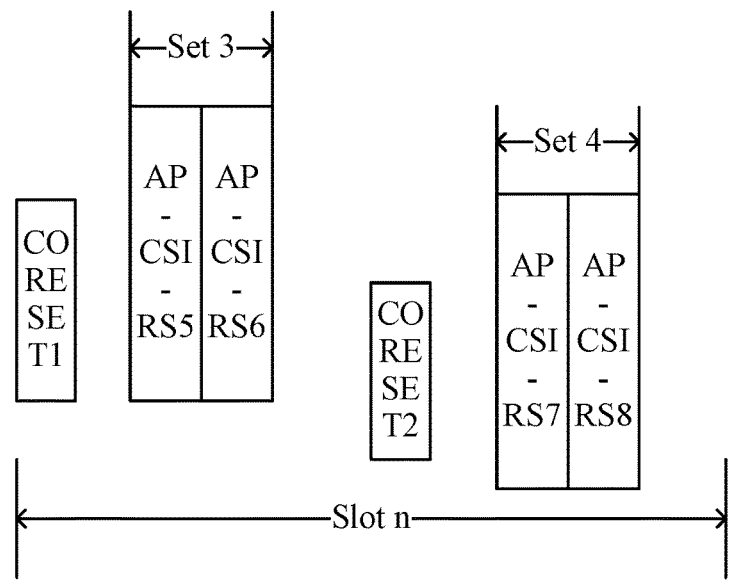
FIG. 5 is a schematic diagram illustrating acquisition of a quasi-co-location reference signal of an AP-CSI-RS according to a CORESET corresponding to a lowest CORESETID in a time domain symbol closest to an AP-CSI-RS set according to an embodiment of the present disclosure.

The default quasi-co-location reference signal is acquired according to the quasi-co-location reference signal of a control resource satisfying a second predetermined characteristic in a time domain symbol closest to an AP-CSI-RS set among time domain symbols where a control resource satisfying a first predetermined characteristic is included. In this manner, the default quasi-co-location reference signals of different sets in the same slot may be different. As shown in FIG. 5, the default quasi-co-location reference signal of set 3 is acquired according to the quasi-co-location reference signal of control resource set 1 (CORESET1), and the quasi-co-location reference signal of set 4 is acquired according to the quasi-co-location reference signal of CORESET2.

(2) Manner Two of Acquiring a Default Quasi-Co-Location Reference Signal

The default quasi-co-location reference signal is acquired according to the quasi-co-location reference signal of a control resource satisfying a second predetermined characteristic in a time unit closest to an AP-CSI-RS set among time units where a control resource satisfying a first predetermined characteristic is included. In this manner, the default quasi-co-location reference signals of different sets in the same slot are the same. As shown in FIG. 5, the default quasi-co-location reference signals of set 3 and set 4 are acquired according to the quasi-co-location reference signal of CORESET1, that is, the default quasi-co-location reference signals of all resources in the same slot are the same of course when the interval between DCI and the AP-CSI-RS is less than K.

(3) Manner Three of Acquiring a Default Quasi-Co-Location Reference Signal

The quasi-co-location reference signals of M AP-CSI-RS resource (aperiodic measurement reference signal resource) groups are determined according to M control resources.

M AP-CSI-RS resource groups belong to one AP-CSI-RS resource set, or M AP-CSI-RS resource groups belong to M AP-CSI-RS resource sets.

The M control resources are M control resources included in the time unit set closest to an AP-CSI-RS resource group among the time unit sets where at least M control resources are included. The M control resources satisfy at least one of the following characteristics: the intersection of time domain resources occupied by the M control resources is not null, and the M control resources are M control resources having the lowest control resource index in the intersection of time domain resources.

The correspondence between the M AP-CSI-RS resource groups and the M control resource groups is obtained through signaling information or a predetermined rule, for example, the i-th AP-CSI-RS resource group is acquired according to the quasi-co-location reference signal of the i-th control resource. 1≤i≤M and i is a positive integer.

A control resource is a control resource set (CORESET) or a search space set, and the quasi-co-location reference signal of the control resource is the quasi-co-location reference signal of the demodulation reference signal of the control resource.

In the embodiment, the quasi-co-location reference signal of one signal is acquired according to the quasi-co-location reference signal of another signal, which indicates that the quasi-co-location reference signal of one signal associated with a type of quasi-co-location parameter is acquired according to the quasi-co-location reference signal of another signal associated with a type of quasi-co-location parameter. The type of quasi-co-location parameter includes at least one of: Doppler shift, Doppler spread, average delay, delay spread, an average gain or a spatial Rx parameter.

The control resource satisfying the first predetermined characteristic includes at least one of the following:
- a control resource that is located in a component carrier (CC) whose center carrier is greater than a predetermined threshold;
- a control resource where a demodulation reference signal of a control channel and a quasi-co-location reference signal satisfy a quasi-co-location relationship with respect to a spatial Rx filtering parameter;
- a control resource where the demodulation reference signal of a control channel is configured with a quasi-co-location reference signal with respect to a spatial Rx filtering parameter;
- a control resource located in a same frequency domain bandwidth as an AP-CSI-RS;
- the demodulation reference signals of different control resources among the M control resources not satisfying a quasi-co-location relationship with respect to a spatial Rx filtering parameter;
- a control resource belonging to a predetermined frequency domain bandwidth or a predetermined frequency domain bandwidth group (such as a CC group or a frequency domain bandwidth part group);
- control resources belonging to one control resource group;
- control resources belonging to one frequency domain bandwidth or one frequency domain bandwidth group; or
- a control resource associated with at least one candidate control channel monitored by a terminal in the time unit.

A control resource may be a CORESET or a search space (SS).

The control resource satisfying the second predetermined characteristic includes at least one of the following:
- a control resource having the lowest identification number in the time unit or the time domain symbol;
- a control resource belonging to a frequency domain bandwidth having a lowest frequency domain bandwidth identification number in a set formed by control resources having the lowest identification number in the time unit or the time domain symbol;
- a control resource having the lowest identification number included in the frequency domain bandwidth having the lowest frequency domain bandwidth identification number in a set formed by frequency domain bandwidths satisfying a third predetermined characteristic in the time unit or the time domain symbol;
- a control resource having the lowest identification number in a set formed by control resources satisfying a fourth predetermined characteristic in the time unit or the time domain symbol;
- a control resource belonging to the frequency domain bandwidth having the lowest frequency domain bandwidth identification number in a set formed by control resources having the lowest identification number in a set formed by the control resources satisfying a fourth predetermined characteristic in the time unit or the time domain symbol; or
- a control resource having the lowest identification number and satisfying a fourth predetermined characteristic included in the frequency domain bandwidth having the lowest frequency domain bandwidth identification number in a set formed by frequency domain bandwidths satisfying a third predetermined characteristic in the time unit or the time domain symbol.

The time domain symbol/time unit closest to an AP-CSI-RS set is the time domain symbol/time unit closest to the first time domain symbol of the AP-CSI-RS set.

2) Manner two of acquiring a quasi-co-location reference signal of an aperiodic measurement reference signal The quasi-co-location reference signal of the aperiodic measurement reference signal is acquired according to whether the intersection is null.

The intersection is the intersection of the time domain symbol set occupied by the AP-CSI-RS resource and the time domain symbol set occupied by the second channel or signal, or the intersection is the intersection of the time domain symbol set occupied by the AP-CSI-RS resource set where the AP-CSI-RS resource is located and the time domain symbol set occupied by the second channel or signal.

The second channel includes at least one of: a physical downlink shared channel (PDSCH), a physical downlink control channel (PDCCH), a demodulation reference signal (DMRS), a CSI-RS or a synchronization signal. The time interval between the second channels or signals and the control information scheduling these channels or signals is greater than or equal to a second threshold. When the second channel is a data channel, the time interval between the data channel and the control information scheduling the data channel may also be less than the second threshold. In this case, the data channel is referred to as a potential data channel.

The first threshold and the second threshold may be the same or different.

When the intersection is not null, the quasi-co-location reference signal of an aperiodic measurement reference signal resource satisfies at least one of the following characteristics: measurement reference signal resources in an aperiodic measurement reference signal resource set share a quasi-co-location reference signal; the quasi-co-location reference signal of the aperiodic measurement reference signal resource is acquired according to the quasi-co-location reference signal of a control resource satisfying the second predetermined characteristic in a time unit closest to the aperiodic measurement reference signal resource among time units where a control resource satisfying the first predetermined characteristic is included; or the quasi-co-location reference signal of the aperiodic measurement reference signal resource is acquired according to the quasi-co-location reference signal of a channel resource satisfying the second predetermined characteristic in a time unit closest to the aperiodic measurement reference signal set where the aperiodic measurement reference signal resource is located among time units where a control resource satisfying the first predetermined characteristic is included.

When the intersection is null, the quasi-co-location reference signal of an aperiodic measurement reference signal resource satisfies at least one of the following characteristics: measurement reference signal resources in an aperiodic measurement reference signal resource set do not share a quasi-co-location reference signal; the quasi-co-location reference signal of the aperiodic measurement reference signal resource is acquired according to the quasi-co-location reference signal of a control resource satisfying the second predetermined characteristic in a time domain symbol closest to the aperiodic measurement reference signal resource among time domain symbols where a control resource satisfying the first predetermined characteristic is included; or the quasi-co-location reference signal of the aperiodic measurement reference signal resource is acquired according to the quasi-co-location reference signal of a control resource satisfying the second predetermined characteristic in a time domain symbol closest to the aperiodic measurement reference signal set where the aperiodic measurement reference signal resource is located among time domain symbols where a control resource satisfying the first predetermined characteristic is included. The quasi-co-location reference signal of the aperiodic measurement reference signal resource is acquired according to whether the intersection is null, and the time interval between the aperiodic measurement reference signal resource and the control information scheduling the aperiodic measurement reference signal resource is less than the first threshold.

When the first threshold is mainly used for the terminal to decode the DCI and hand over a receive beam, the terminal receives an AP-CSI-RS by using an active receive antenna, and the first threshold is the first value. When the first threshold is mainly used for the terminal to decode the DCI and hand over a receive beam and the receive antenna of the terminal corresponding to the AP-CSI-RS is in an inactive state, the terminal also needs to activate the antenna before receiving the AP-CSI-RS, and the first threshold is the second value. The first value and the second value are two different values, and the first value is less than the second value.

Which value the first threshold is to take (for example, which of the first value and the second value, not excluding the possibility that the first threshold has more than two values) may be acquired in at least one of the manners described below.

Manner one of acquiring the first threshold: the first threshold is acquired according to signaling information, where the signaling information includes information about the first threshold. For example, the first threshold is configured in an AP-CSI-RS resource, or in an AP-CSI-RS resource set or in an AP-CSI-RS resource setting. Similarly, the first threshold may also be acquired according to the set index information of the aperiodic measurement reference signal set where the aperiodic measurement reference signal resource is located, or the first threshold may be acquired according to the aperiodic measurement reference signal resource index information.

Manner two of acquiring the first threshold: the first threshold is acquired according to parameter information associated with an aperiodic measurement reference signal resource. The parameter information includes at least one of: a QCL-RS or repetition information configured in a set where the aperiodic measurement reference signal resource is located. When repetition is configured to be on, different AP-CSI-RS resources in a set have the same transmit beams, and the terminal performs receive beam training. When repetition is configured to be off, different AP-CSI-RS resources in a set have different transmit beams, and the receive beams of the terminal are fixed. Therefore, when repetition is configured to be off, the first threshold may be smaller, and when repetition is configured to be on, the first threshold may be larger.

Manner three of acquiring the first threshold: the first threshold is acquired according to group information associated with the aperiodic measurement reference signal resource. The group information may be grouping information of measurement reference signal indication information fed back when the channel state information of the terminal is fed back or group information corresponding to the aperiodic measurement reference signal indicated by a base station. Different group information is associated with different receive antenna groups. The first threshold is a third value when the group information corresponding to DCI or a downlink signal in a time domain symbol closest to an AP-CSI-RS is the same as the group information corresponding to the AP-CSI-RS. The first threshold is a fourth value when the group information corresponding to DCI or a downlink signal in a time domain symbol closest to an AP-CSI-RS is different from the group information corresponding to the AP-CSI-RS. The third value is less than the fourth value.

Manner four of acquiring the first threshold: the first threshold is acquired according to information about an activation state of a receive antenna associated with the aperiodic measurement reference signal resource. The first threshold value is the first value if the receive antenna of the AP-CSI-RS resource is in an active state, and the first threshold value is the second value if the receive antenna of the AP-CSI-RS resource is in an inactive state. Similarly, the first threshold may also be determined according to the activation state of the current receive antenna of the terminal. The activation state of the receive antenna indicates the time domain position of the AP-CSI-RS resource in the DCI.

Manner five of acquiring the first threshold: the first threshold is determined according to whether a data channel or signal exists in a time domain symbol or at a time moment where the aperiodic measurement reference signal resource is located. The first threshold is a seventh value when the downlink channel or signal exists, and the first threshold is an eighth value when no downlink channel or signal exists. The seventh value is greater than the eighth value.

Manner six of acquiring the first threshold: the first threshold is determined according to whether the configuration information of the QCL-RS of other downlink channels or signals in a time domain symbol or at a time moment where the aperiodic measurement reference signal resource is located and the QCL-RS of the aperiodic measurement reference signal resource satisfy a quasi-co-location relationship. The first threshold is a ninth value when the quasi-co-location relationship is satisfied, and the first threshold is a tenth value when the quasi-co-location relationship is not satisfied. The ninth value is greater than the tenth value.

Other downlink channels or signals are previously scheduled downlink channels or signals. For example, the time interval between the control information scheduling these downlink channels or signals and the downlink channels or signals is greater than or equal to a predetermined threshold, or these channels or signals are triggered by higher-layer signaling, such as periodic measurement reference signals, control channels and semi-persistent data channels. Of course, other downlink channels or signals may also be downlink channels or signals scheduled by other DCI. The time interval between other DCI and downlink channels or signals is less than the predetermined threshold.

Manner seven of acquiring the first threshold: the first threshold is determined according to whether to be in an activation state of a discontinuous reception period, that is, whether the MAC layer of a terminal in the DRX period is in an active state, or whether the interval time domain between the time domain symbol where the DCI is located and the wake-up starting position of the DRX state is greater than a predetermined value. For example, the first threshold is a larger value if the time domain symbol where the AP-CSI-RS is located is in the DRX state, or the first threshold is a larger value if the time interval between the time domain symbol where the DCI is located and the wake-up starting position in the DRX is less than the predetermined value, for example, if the DCI is in the just wake-up position.

Manner eight of acquiring the first threshold: the first threshold is acquired according to whether a value of fifth capability information reported by a terminal belongs to a predetermined set. When the value of the fifth capability information reported by the terminal belongs to the predetermined set, the first threshold is the value of the fifth capability information reported by the terminal. When the value of the fifth capability information reported by the terminal does not belong to the predetermined set, the first threshold is the value of the first capability information reported by the terminal.

The fifth capability information includes one of: the second capability information to the fourth capability information. The first capability information to the fourth capability information satisfy the characteristics described below.

The first capability information reported by the terminal is used for indicating a minimum time interval required by the communication node to detect physical layer control information and apply spatial domain quasi-co-location reference signal information indicated in the physical layer control information for receiving a data channel.

For the second capability information reported by the terminal, the second capability information is used for indicating a minimum time interval required by the communication node between a time of physical layer control information and a time when spatial domain quasi-co-location reference signal information indicated in the physical layer control information is used to receive the aperiodic measurement reference signal.

For the third capability information reported by the terminal, the third capability information is used for indicating a minimum time interval required by the communication node from a time when the communication node detects physical layer control information to a time when spatial domain quasi-co-location reference signal information indicated in the physical layer control information is used to receive the aperiodic measurement reference signal. The communication node receives the aperiodic measurement reference signal by using an inactive antenna.

For the fourth capability information reported by the terminal, the fourth capability information is used for indicating: when the communication node receives an aperiodic measurement reference signal, a minimum time interval between the aperiodic measurement reference signal and physical layer control information scheduling the aperiodic measurement reference signal.

Figure 6:
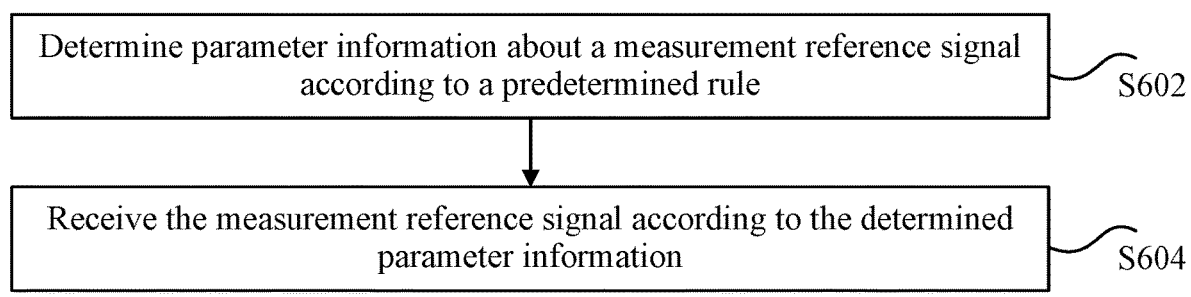
FIG. 6 is a flowchart of a signal reception method according to an embodiment of the present disclosure.

The embodiment further provides a signal reception method executed on the mobile terminal described above. FIG. 6 is a flowchart of a signal reception method according to an embodiment of the present disclosure. As shown in FIG. 6, the method includes the steps described below.

In step S602, parameter information of a measurement reference signal is determined according to a predetermined rule.

In step S604, the measurement reference signal is received according to the determined parameter information.

The step of determining the parameter information of the measurement reference signal according to a predetermined rule includes that the communication node does not desire to receive parameter configuration information of a measurement reference signal that does not satisfy the predetermined rule, where the communication node is a communication node that receives the measurement reference signal.

Through the preceding steps, the parameter information of a measurement reference signal is determined according to the predetermined rule, and the measurement reference signal is received according to the determined parameter information. The measurement reference signal (aperiodic measurement reference signal) can be received according to the determined parameter information, solving the problem in the related art that the system cannot operate due to improper configuration of the measurement reference signal or that the signaling notification load of the measurement reference signal is large, and achieving the technical effects of normal operation of the system and effective saving of signaling overhead.

The preceding steps may, but may not necessarily, be executed by a terminal.

The parameter information may be quasi-co-location reference signal information of a measurement reference signal resource, and the measurement reference signal resource may be an aperiodic measurement reference signal resource.

The predetermined rule includes at least one of the rules described below.

In a case where a measurement reference signal resource is of a predetermined type, a frequency domain bandwidth part of the measurement reference signal resource is D frequency domain bandwidth parts, where D is a positive integer greater than or equal to 1.

In a case where a measurement reference signal resource is of a predetermined type, an intersection of a frequency domain resource configured in a measurement reference signal resource and a frequency domain resource included in each frequency domain bandwidth part in one frequency domain bandwidth part set is not null.

In a set of a plurality of measurement reference signal resource sets where one measurement reference signal resource index is located, configuration information of a frequency domain bandwidth part of each of the plurality of measurement reference signal resource sets is the same.

One measurement reference signal resource index is associated with information about merely one frequency domain bandwidth part in one component carrier.

One measurement reference signal resource is included at least in one set of measurement reference signal resource sets.

In a case where a measurement reference signal resource is configured in spatial filtering parameter information of a transmitted signal, the spatial filtering parameter information includes information about a frequency domain bandwidth part where the measurement reference signal resource is located.

Each frequency domain bandwidth part among the D frequency domain bandwidth parts satisfies at least one of the conditions described below.

An intersection of a frequency domain resource included in the each frequency domain bandwidth part and the frequency domain resource configured in the measurement reference signal resource is not null.

An intersection of a time resource set in an active state in the each frequency domain bandwidth part and a time domain resource configured in the measurement reference signal resource is not null.

A time domain resource configured in the each measurement reference signal resource is a subset of a time resource set in an active state in an active frequency domain bandwidth part.

The D frequency domain bandwidth parts belong to one frequency domain bandwidth part set.

In response to the measurement reference signal resource being of a predetermined type, D is greater than or equal to 1.

The frequency domain resources configured in the reference signal resource of a predetermined type include the frequency domain resource included in each frequency domain bandwidth part in one frequency domain bandwidth part set.

A reference signal of the predetermined type includes at least one of: a measurement reference signal for beam failure detection, a candidate reference signal, a measurement reference signal for link detection or a measurement reference signal not configured with frequency domain bandwidth part information.

One frequency domain bandwidth part set is a set of frequency domain bandwidth parts included in one component carrier.

The measurement reference signal may be an aperiodic measurement reference signal.

In an implementation, in a case where the measurement reference signal is an aperiodic measurement reference signal, the predetermined rule includes acquiring, according to third information, time offset information of an aperiodic measurement reference signal resource where the aperiodic measurement reference signal is located. The third information includes at least one of:

quasi-co-location reference signal information of the aperiodic measurement reference signal resource;

a value of capability information reported by a communication node;

an aperiodic measurement reference signal resource index;

a set index of an aperiodic measurement reference signal resource set including the aperiodic measurement reference signal resource;

an activation state of a reception resource associated with the aperiodic measurement reference signal resource;

a decision result of whether a time domain symbol position of the aperiodic measurement reference signal resource is within a predetermined range;

a decision result of whether combined configuration information about a time domain symbol position of the aperiodic measurement reference signal resource and a time offset in a resource set where the aperiodic measurement reference signal resource is located satisfies a predetermined condition;

first threshold information corresponding to a resource set where the aperiodic measurement reference signal resource is located;

a decision result of whether a value of capability information reported by a communication node belongs to a predetermined set;

a decision result of whether time offset information is configured in an aperiodic measurement reference signal resource set; or a configuration situation of a spatial transmission parameter in an aperiodic measurement reference signal resource set.

In response to no time offset information being configured in an aperiodic measurement reference signal resource set, a time offset of the aperiodic measurement reference signal resource is a predetermined value, where the predetermined value is the value of the capability information reported by the communication node.

In response to the third information satisfying a predetermined characteristic, the time offset is capability information reported by the communication node.

The predetermined set includes {224 time domain symbols, 336 time domain symbols}.

The capability information reported by the communication node includes one of second capability information, third capability information or fourth capability information. The second capability information is used for indicating a minimum time interval required by the communication node between a time of physical layer control information and a time when spatial domain quasi-co-location reference signal information indicated in the physical layer control information is used to receive the aperiodic measurement reference signal. The third capability information is used for indicating: in a case where the aperiodic measurement reference signal is received by using an inactive antenna, a minimum time interval required by the communication node from a time when the communication node detects physical layer control information to a time when spatial domain quasi-co-location reference signal information indicated in the physical layer control information is used to receive the aperiodic measurement reference signal. The fourth capability information is used for indicating: when the communication node receives the aperiodic measurement reference signal, a minimum time interval between the aperiodic measurement reference signal and physical layer control information scheduling the aperiodic measurement reference signal.

The configuration situation of the spatial transmission parameter in the aperiodic measurement reference signal resource set includes at least one of the following: the spatial transmission parameter is configured in the set, the spatial transmission parameter is not configured in the set, the spatial transmission parameter in the set is configured to be that repetition is on, or the spatial transmission parameter in the set is configured to be that repetition is off.

The predetermined characteristic includes at least one of the characteristics described below.

The aperiodic measurement reference signal resource index is information about a highest resource index in one frequency domain bandwidth.

The spatial transmission parameter (such as a repetition parameter) is configured in the aperiodic measurement reference signal resource set.

The predetermined set includes {224 time domain symbols, 336 time domain symbols}.

In a case where the reported capability information is 224 time domain symbols, the time offset is 24 time units.

In a case where the reported capability information is 336 time domain symbols, the time offset is 36 time units.

The frequency domain bandwidth is a component carrier (CC) or a frequency domain bandwidth part (BWP).

In another implementation, in a case where the measurement reference signal is an aperiodic measurement reference signal, the predetermined rule includes at least one of the rules described below.

In a case where C aperiodic measurement reference signal resource sets correspond to a same time offset, quasi-co-location reference signals of one aperiodic measurement reference signal resource index in C aperiodic reference signal sets are the same.

In a case where C aperiodic measurement reference signal resource sets correspond to a same time offset, quasi-co-location reference signals of one aperiodic measurement reference signal resource index in C aperiodic reference signal sets satisfy a quasi-co-location relationship.

In a case where C aperiodic measurement reference signal resource sets correspond to a same time offset, one aperiodic measurement reference signal resource index is configured with no quasi-co-location reference signal in all of the C aperiodic reference signal sets.

In a case where C aperiodic measurement reference signal resource sets correspond to a same time offset, one aperiodic measurement reference signal resource index is configured with a quasi-co-location reference signal in each of the C aperiodic measurement reference signal resource sets.

In a case where C aperiodic measurement reference signal resource sets correspond to different time offsets, quasi-co-location reference signals of one aperiodic measurement reference signal resource index in C aperiodic reference signal sets are the same or different.

Quasi-co-location reference signals of aperiodic measurement reference signal resources having a same resource index and belonging to a same component carrier at a same time moment have a same configuration.

Aperiodic measurement reference signal resources having a same resource index and belonging to a same component carrier at a same time moment have a same parameter configuration.

Aperiodic measurement reference signal resources having a same resource index and belonging to a same component carrier at a same time moment are not capable of being associated with more than one quasi-co-location reference signal.

Configuration information of frequency domain bandwidth parts in a set of a plurality of measurement reference signal resource sets where a same aperiodic measurement reference signal resource index is located is the same.

One aperiodic measurement reference signal resource is at least in one set of aperiodic measurement reference signal sets and/or at least of a predetermined type.

One aperiodic measurement reference signal resource is included at least in one set of aperiodic measurement reference signal sets.

One aperiodic measurement reference signal resource index is not capable of being configured with more than one set of quasi-co-location reference signals in one trigger state.

One aperiodic measurement reference signal resource index is not capable of being configured with more than one set of quasi-co-location reference signals in one aperiodic measurement reference signal set.

One aperiodic measurement reference signal resource index is capable of being associated with merely one aperiodic measurement reference signal set in one trigger state.

One aperiodic measurement reference signal resource index is not capable of being triggered for a plurality of times in one trigger state.

One aperiodic measurement reference signal resource index is capable of being associated with merely one time offset in one trigger state.

Each of the C aperiodic measurement reference signal resource sets includes the one aperiodic measurement reference signal resource index, the C aperiodic measurement reference signal resource sets correspond to one trigger state, and C is a positive integer greater than 1.

The same time moment may include the same time domain symbol, the same slot or the same subframe.

The step of determining the parameter information of the measurement reference signal according to the predetermined rule includes that in a case where a first-type parameter of the measurement reference signal is not configured, the first-type parameter of the measurement reference signal takes a predetermined value.

The frequency domain span of the measurement reference signal indicates the number of PRBs between the starting physical resource block (PRB) and the highest PRB occupied by the measurement reference signal. The measurement reference signal occupies frequency domain resources in one PRB per d PRBs in the frequency domain bandwidth.

A time unit is a slot. The quasi-co-location reference signal of the aperiodic measurement reference signal indicates that the aperiodic measurement reference signal and the quasi-co-location reference signal satisfy a quasi-co-location relationship with respect to a type of quasi-co-location parameter. The type of quasi-co-location parameter includes a spatial Rx parameter.

The same time moment may include the same time domain symbol, the same slot or the same subframe.

The signal reception method in the embodiment is illustrated in conjunction with the examples described below.

Example Two

In the embodiment, parameter information of a measurement reference signal is determined according to an agreed rule, and the measurement reference signal is received according to the parameter information. The step of determining the parameter information of the measurement reference signal includes that the parameter information of the measurement reference signal needs to satisfy the agreed rule.

The time offset information of the AP-CSI-RS is configured in the AP-CSI-RS set, and the time offset that may be configured in the AP-CSI-RS set is within the range of 0 to 4. The time offset indicates the time unit offset between the time unit where the DCI scheduling the AP-CSI-RS and the time unit where the AP-CSI-RS is located. For example, an offset of 0 indicates that DCI and the AP-CSI-RS are in the same time unit. In the embodiment, a time unit may be a subframe, a slot, or a time unit in which a predetermined number of time domain symbols is included. However, for the capability of a user equipment (UE), for example, a certain delay exists between the time when the terminal decodes the DCI and the time when the QCL-RS indicated in the DCI is used to receive the AP-CSI-RS. If the AP-CSI-RS is received by using an inactive receive antenna, the terminal needs to decode the DCI and activate the receive antenna before receiving the AP-CSI-RS. The minimum time interval between the DCI and the AP-CSI-RS reported in the capability information report of the UE (or the minimum time interval required for the QCL-RS indicated in the DCI to be applied to the AP-CSI-RS) includes {224, 336} time domain symbols. When the capability information reported by the terminal is 224 or 336, it is necessary to determine which AP-CSI-RS sets/AP-CSI-RS resources adopt these offsets, Such determination may be performed in the manners described below.

Manner one: $\lfloor x/N_s \rfloor x \in \{224,336\}$ time offsets are adopted for a resource in a set having a predetermined set ID among AP-CSI-RS sets, where $x \in \{224,336\}$ denotes the capability reported by the terminal, $N_s$ denotes the number of time domain symbols included in one time unit, and $\lfloor \cdot \rfloor$ denotes a round-down operation. $N_s$ is 14 when a Normal cyclic prefix (NCP) is adopted. $N_s$ is 12 when an extended cyclic prefix is adopted. The preceding time offset is $\lfloor x/N_s \rfloor$. In this case, the efficiency is high, but it cannot be ensured that the time interval between DCI and the AP-CSI-RS resource in the AP-CSI-RS set is greater than or equal to x. Therefore, $\lceil x/N_s \rceil$ may also be adopted for the time offset. $\lceil \cdot \rceil$ denotes a round-up operation. For example, the time offset when the AP-CSI-RS set ID is the lowest is $\lfloor x/N_s \rfloor$ or $\lceil x/N_s \rceil$. If $\lfloor x/N_s \rfloor N_s + y \geq x$, the time offset is $\lfloor x/N_s \rfloor$; otherwise, the time offset is $\lceil x/N_s \rceil$, where y denotes a time domain symbol index of the first time domain symbol occupied by the AP-CSI-RS in one slot. The time offset when the AP-CSI-RS set ID is the lowest in a CC/BWP is a predetermined value. The predetermined value is acquired based on the capability information reported by the terminal. The embodiment does not exclude specifying the time offset when the AP-CSI-RS set ID/predetermined set ID (such as 2) is the highest in a CC/BWP as the predetermined value. Similarly, the time offset may also be determined according to an AP-CSI-RS resource ID. In this case, the unit of the time offset is a time domain symbol. For example, the time offset for the AP-CSI-RS resource ID with one of the highest resource ID, the lowest resource ID, or a predetermined resource ID is at least x, and the true offset is determined according to the time domain symbol position occupied by the AP-CSI-RS in the slot.

According to the time offset when the AP-CSI-RS set ID is the highest/the set ID (such as 2) is predetermined in a CC/BWP and when the configuration of the repetition in the set satisfies a predetermined condition, the time offset of the set is a predetermined value. The configuration of the repetition satisfying the predetermined condition includes at least one of the following: repetition information is configured in the set, repetition information is not configured in the set, a repetition value is on or a repetition value is off. When repetition in a set is on, the terminal assumes that the spatial transmission filtering parameters of the resources in the set are the same; when repetition in a set is off, the terminal assumes that the spatial transmission filtering parameters of the resources in the set are different. Repetition may also be referred to as a transmission filtering parameter control parameter.

Manner two: the time offset information of an aperiodic measurement reference signal is determined according to the activation state of the reception resource associated with the aperiodic measurement reference signal. If the receive antenna is in an active state, the time offset is the time offset configured in the AP-CSI-RS set where the aperiodic measurement reference signal is located. If the receive antenna is in an inactive state, the time offset is the time offset, $\lfloor X/N_s \rfloor$ or $\lceil x/N_s \rceil$, configured in the AP-CSI-RS set where the aperiodic measurement reference signal is located.

Manner three: if a resource set associated with an aperiodic measurement reference signal resource is not configured with time offset information and an aperiodic measurement reference signal is configured with a quasi-co-location reference signal associated with a spatial Rx parameter, the time offset of the aperiodic measurement reference signal resource is a predetermined value, for example, the time offset is $\lfloor x/N_s \rfloor$ or $\lceil x/N_s \rceil$.

Manner four: determination is performed according to whether the time domain symbol position configured in the AP-CSI-RS resource is within a predetermined range. For example, when the last time domain symbol in one slot is included in the time domain symbol position and the capability information reported by the terminal is 224 time domain symbols, the time offset of the AP-CSI-RS resource/ the set where the AP-CSI-RS resource is located is $\lfloor x/N_s \rfloor$ or $\lceil x/N_s \rceil$. Similarly, whether the combination of the time domain symbol position configured in the AP-CSI-RS resource and the time offset configured in the set satisfies an agreed condition may also be adopted, and then the time offset of the AP-CSI-RS resource/the set where the AP-CSI-RS resource is located is $\lfloor x/N_s \rfloor$ or $\lceil x/N_s \rceil$. For example, one set includes an AP-CSI-RS resource occupying the last time domain symbol in one slot, and the time offset of the set is x1 (for example, 4 or another value), and then the time offset of the set where the AP-CSI-RS resource is located is $\lfloor x/N_s \rfloor \lfloor x/N_s \rfloor$ or $\lceil x/N_s \rceil$. $x \in \{224,336\}$ is the capability reported by the terminal.

Manner five: A time offset is determined according to information about a threshold configured in a set. When the interval between the DCI and the AP-CSI-RS is less than the threshold, the first type of method is used to acquire the quasi-co-location reference signal of the AP-CSI-RS. When the interval between the DCI and the AP-CSI-RS is greater than or equal to the threshold, the second type of method is used to acquire the quasi-co-location reference signal of the AP-CSI-RS.

The time offset information of the aperiodic measurement reference signal is acquired according to the capability information reported by the terminal. The time offset information is $\lfloor x/N_s \rfloor$ or $\lceil x/N_s \rceil$ and may of course also be directly specified. When the reported capability information is 224 time domain symbols, the time offset is 16. When the reported capability information is 336 time domain symbols, the time offset is 24.

Example Three

The frequency domain bandwidth part (BWP) information of a CSI-RS resource ID in the NR is configured in the CSI-RS resource setting. When merely CC information and CSI-RS resource ID information are given, the BWP information of the CSI-RS resource ID cannot be determined. Therefore, at least one of the agreed rules described below may be provided.

Rule one: if a measurement reference signal resource is not configured with frequency domain bandwidth part information (or a measurement reference signal is of a predetermined type, for example, the measurement reference signal belongs to a beam failure detection reference signal set $q_0$, the measurement reference signal belongs to a candidate reference signal set $q_1$ or the measurement reference signal is a radiolink monitoring (RLM) reference signal, then the frequency domain bandwidth part of a measurement reference signal resource is a frequency domain bandwidth part among one or more active frequency domain bandwidth parts, or the intersection of the frequency domain resources included in the active frequency domain bandwidth part and the frequency domain resources configured in the measurement reference signal resource is not null, and/or the intersection of the set of time resources in which the active frequency domain bandwidth part is in an active state and the time domain resources configured in the measurement reference signal resources is not null. That is, the active frequency domain bandwidth part intersects with the PRB resource/time domain resource (the time domain resource is obtained according to a period offset and the time domain symbol position) configured in the configuration information of the measurement reference signal resource.

A measurement reference signal of a predetermined type includes at least one of a measurement reference signal for beam failure detection, a candidate reference signal resource, a measurement reference signal for link detection or a measurement reference signal not configured with frequency domain bandwidth part information.

Rule two: configuration information about frequency domain bandwidth parts in a set of more than one measurement reference signal resource sets where a same measurement reference signal resource index is located is the same. For example, a resource ID is included in a plurality of resource settings, and then the BWP information in the plurality of resource settings is the same.

Rule three: one measurement reference signal resource index is associated with information about merely one frequency domain bandwidth part in one CC.

Rule four: one measurement reference signal resource is included at least in one set of measurement reference signal resource sets. Therefore, the BWP information of a measurement reference signal resource can be obtained according to the BWP information in the set (that is, resource setting) of measurement reference signal resource sets.

Rule five: when a measurement reference signal resource is configured in the spatial filtering parameter information of a transmitted signal, the spatial filtering parameter information includes information about the frequency domain bandwidth part where the measurement reference signal resource is located. For example, a CSI-RS resource ID is configured in SpatialRelationInfo of a sounding reference signal (SRS)/PUCCH, and BWP information further needs to be configured in SpatialRelationInfo.

Example Four

For the trigger mechanism of an AP-CSI-RS as shown in FIG. 3, one trigger state is associated with up to 16 pieces of associatedconfigInfo; for one piece of associatedconfigInfo, one set is selected for each of the three resource settings, so the same resource/resource set is associated with more than one piece of associatedconfigInfo in the same trigger state. A quasi-co-location reference signal is configured for this resource in each piece of associatedconfigInfo. Therefore, at least one of the predetermined rules described below is required.

Predetermined rule one: a quasi-co-location reference signal of an aperiodic measurement reference signal resource is determined according to the time offset information in an aperiodic measurement reference signal resource set. For example, in the same trigger state, the same aperiodic measurement reference signal resource index (resource ID) is associated with more than one aperiodic measurement reference signal resource set (resource set).

If different sets are associated with different associatedconfigInfo/report setting information and the time offsets in more than one set are the same, one aperiodic measurement reference signal resource index is associated with the same quasi-co-location reference signal in more than one aperiodic measurement reference signal set; if the time offsets in more than one set are different, one aperiodic measurement reference signal resource index may be associated with a plurality of quasi-co-location reference signals in more than one aperiodic measurement reference signal set, that is, one quasi-co-location reference signal is associated with the resource index separately in each set. The preceding scheme may also be referred to as that whether the quasi-co-location reference signals of the same resource ID associated with different associatedconfigInfo/report settings in the same trigger state are the same needs to be determined according to whether the time offsets configured for the same resource ID in these pieces of associatedconfigInfo/report settings are the same.

Predetermined rule two: the quasi-co-location reference signals of aperiodic measurement reference signal resources having the same resource index and belonging to the same CC at the same time moment have the same configuration. That is, aperiodic measurement reference signal resources having the same resource index and belonging to the same CC at the same time moment cannot be associated with more than one quasi-co-location reference signal. For example, the quasi-co-location reference signals of the same resource in the same time domain symbol set in one CC need to have the same configuration. Otherwise, the terminal cannot make a determination since the same resource is associated with a plurality of quasi-co-location reference signals. Alternatively, when a plurality of quasi-co-location reference signals associated with the same resource are different, the quasi-co-location reference signal of the AP-CSI-RS is determined by using the quasi-co-location reference signal configured in the agreed associatedconfigInfo/report setting.

Predetermined rule three: configuration information of frequency domain bandwidth parts in a set of a plurality of measurement reference signal resource sets where a same aperiodic measurement reference signal resource index is located is the same. For example, the same resource ID is included in different resource settings, but the BWP configuration information in these resource settings is different, which will cause the terminal to be unable to receive the CSI-RS.

The same time moment includes the same time domain symbol, the same slot or the same subframe.

Predetermined rule four: One aperiodic measurement reference signal resource is included at least in one set of aperiodic measurement reference signal sets, so that the BWP information of such aperiodic measurement reference signal can be determined.

On the other hand, since the time offset of the AP-CSI-RS is determined in the resource set, the following agreement needs to be provided for the BWP: an aperiodic measurement reference signal resource is included in at least one aperiodic measurement reference signal set.

Example Five

In the embodiment, when a measurement reference signal is of a predetermined type, the parameter of the measurement reference signal satisfies a predetermined rule. The predetermined type includes a measurement reference signal for beam failure detection (for example, a terminal detects a reference signal in a reference signal set $q_0$ for beam failure detection so as to detect whether a beam failure event occurs), a candidate reference signal (after the terminal detects the beam failure event, a reference signal is selected from a candidate reference signal set, and it may be considered that different reference signals correspond to different transmit beam of a base station), a measurement reference signal for link detection (that is, for RLM detection) and a measurement reference signal not configured with frequency domain bandwidth part information. The predetermined rule includes at least one of the rules described below.

Rule one: in a case where a measurement reference signal resource is of a predetermined type, a frequency domain bandwidth part of the measurement reference signal resource is D frequency domain bandwidth parts, where D is a positive integer greater than or equal to 1. A frequency domain resource configured in a measurement reference signal intersects with a frequency domain resource in each frequency domain bandwidth part among D frequency domain bandwidth parts. The time domain resource obtained by the measurement reference signal according to a time domain parameter (such as a period, a time offset, a time domain symbol occupied in a slot) intersects with the time domain resource in an active state in the frequency domain bandwidth part. The D frequency domain bandwidth parts belong to one CC, or the D frequency domain parts at least include a default frequency domain bandwidth part or an initial bandwidth part.

Rule two: in a case where a measurement reference signal resource is of a predetermined type, an intersection of a frequency domain resource configured in a measurement reference signal resource and a frequency domain resource included in each frequency domain bandwidth part in one frequency domain bandwidth part set is not null. The one frequency domain bandwidth part set refers to all frequency domain bandwidth parts included in one CC. Alternatively, the one frequency domain bandwidth part set includes at least one of a default frequency domain bandwidth part or an initial bandwidth part.

Figure 7:
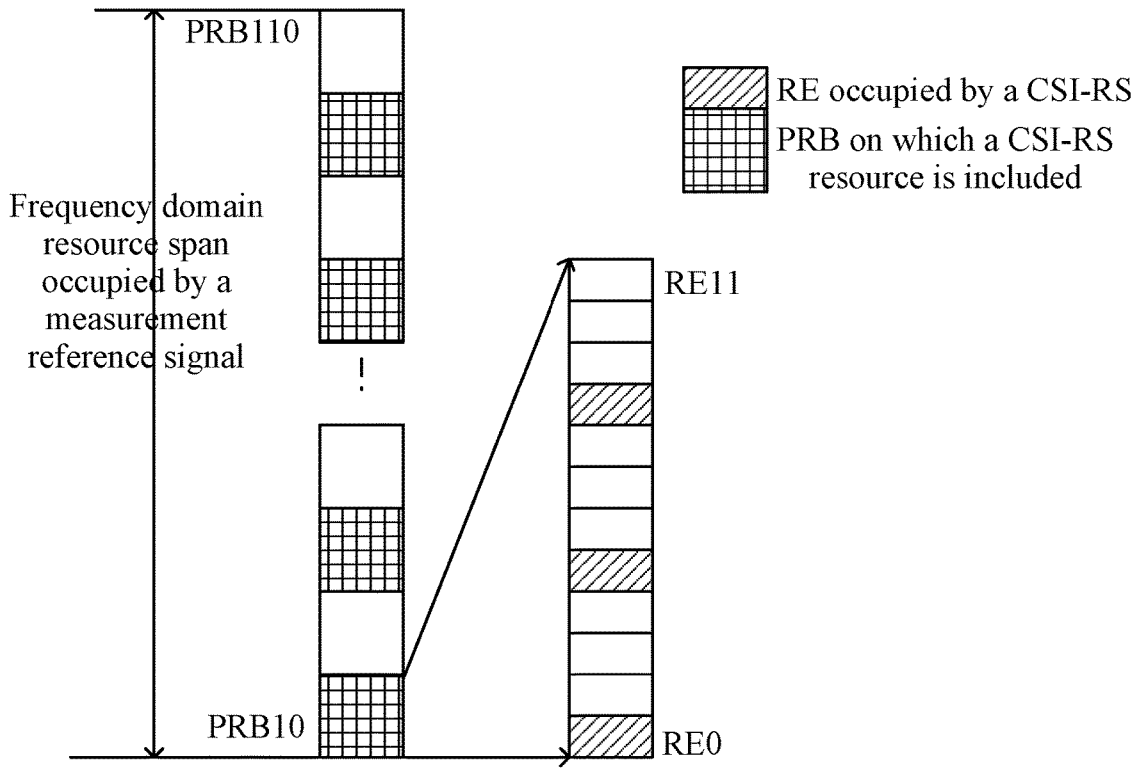
FIG. 7 is a diagram showing a frequency domain span occupied by a CSI-RS according to an embodiment of the present disclosure.

Rule three: in a case where a measurement reference signal resource is of a predetermined type, a frequency domain resource span of the measurement reference signal resource is one frequency domain bandwidth. For example, the frequency domain resource span is one predetermined frequency domain bandwidth part (BWP) or one CC. One frequency domain bandwidth herein is one BWP or one CC. The frequency domain span of a measurement resource indicates the number of PRBs included between the highest PRB and the lowest PRB. The measurement reference signal occupies resources in one PRB per d PRBs in the frequency domain resource span. As shown in FIG. 7, the frequency domain span of a CSI-RS resource is 100 PRBs, one of every two PRBs among the 100 PRBs includes a resource element (RE, that is, subcarrier) occupied by the CSI-RS, and the RE occupied by the CSI-RS in one PRB is shown in FIG. 7. In this case, the CC is the frequency domain bandwidth corresponding to a special cell (SPcell), or the BWP includes at least one of a default BWP or an initial BWP.

Example Six

In the embodiment, in a case where a first-type parameter of a measurement reference signal resource is not configured, the first-type parameter of the measurement reference signal resource takes a predetermined value. The first-type parameter includes at least one of: a frequency domain span of the measurement reference signal resource or a quasi-co-location reference signal of the measurement reference signal resource.

For example, the frequency domain span of the measurement reference signal is the frequency domain span included in the frequency domain bandwidth where the measurement reference signal is located, where one frequency domain bandwidth is one CC or one BWP. When the frequency domain span of the measurement reference signal is not configured, the frequency domain span is the number of PRBs included in the CC or BWP where the CSI-RS is located. For the CSI-RS, one of every d PRBs in the frequency domain span includes an RE occupied by the CSI-RS, as shown in FIG. 7.

The quasi-co-location reference signal of the measurement reference signal is a quasi-co-location reference signal of a predetermined item in a list of quasi-co-location reference signals configured in a frequency domain bandwidth, such as a quasi-co-location reference signal included in a first item in a TCI pool configured in the CC/BWP.

The quasi-co-location reference signal of the measurement reference signal is a quasi-co-location reference signal of a predetermined control resource. For example, the quasi-co-location reference signal of the measurement reference signal is a quasi-co-location reference signal of the CORESET having the lowest CORESETID in the time unit closest to the measurement reference signal among the time units including control resource of predetermined CC/BWP.

The above is to take a specific value when the first-type parameter of the measurement reference signal is not configured. It may be defined that the first-type parameter of the measurement reference signal takes a predetermined value when the first-type parameter of the measurement reference signal is not configured and the value of the second-type parameter of the measurement reference signal resource meets a predetermined condition. The value of the second-type parameter of the measurement reference signal resource meeting a predetermined condition includes what is described below.

Condition one: no spatial transmission filtering parameter is configured in a measurement reference signal resource set where the measurement reference signal resource is located. The spatial transmission filtering parameter is a repetition parameter. When the repetition parameter is configured, the measurement reference signal in the set is a measurement reference signal for beam management.

Condition two: a spatial transmission filtering parameter in a measurement reference signal resource set where the measurement reference signal resource is located is configured to be off.

Condition three: a spatial transmission filtering parameter in a measurement reference signal resource set where the measurement reference signal resource is located is configured to be on.

Condition four: a time domain behavior of the measurement reference signal resource is of a predetermined type. The time domain behavior includes a periodic time domain behavior, a half-periodic time domain behavior and an aperiodic time domain behavior. For example, when the quasi-co-location parameter of the aperiodic measurement reference signal is not configured, a predetermined value may be adopted.

Condition five: reporting information associated with the measurement reference signal resource satisfies a predetermined characteristic. For example, the type of reporting information in reporting associated with the CSI-RS is 'none', that is, channel state information is not reported.

Figure 8:
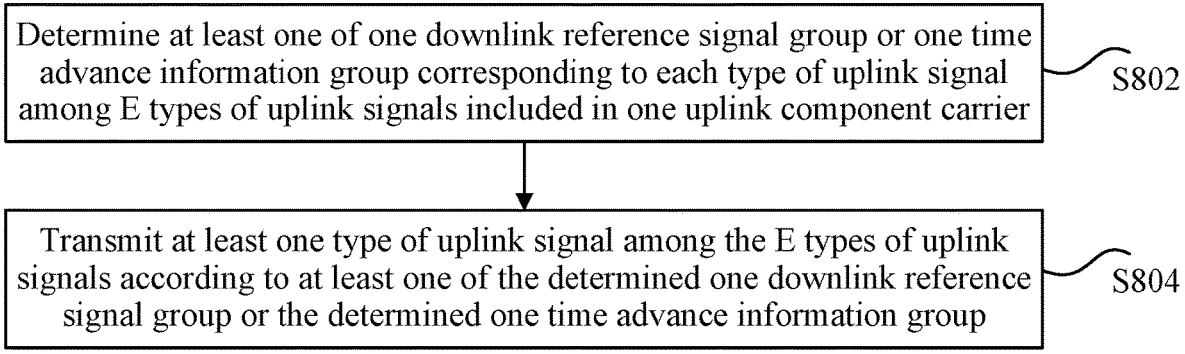
FIG. 8 is a flowchart of a signal transmission method according to an embodiment of the present disclosure.

The embodiment further provides a signal transmission method executed on the mobile terminal described above. FIG. 8 is a flowchart of a signal transmission method according to an embodiment of the present disclosure. As shown in FIG. 8, the method includes the steps described below.

In step S802, at least one of one downlink reference signal group or one time advance information group corresponding to each type of uplink signal among E types of uplink signals included in one uplink component carrier is determined, where the E types of uplink signals correspond to at least one of E downlink reference signal groups or E time advance information groups, and E is a positive integer greater than or equal to 1.

In step S804, at least one type of uplink signal among the E types of uplink signals is transmitted according to at least one of the determined one downlink reference signal group or the determined one time advance information group.

According to the technical solution of the embodiment of the present disclosure, a plurality of transmission reception points (TRPs) which are relatively far apart can simultaneously serve one UE.

Information about a time advance of an uplink frame timing relative to a downlink frame timing of each type of uplink signal is obtained according to a time advance included in one time advance information group corresponding to the each type of uplink signal, and the downlink frame timing is obtained according to a downlink reference signal in one downlink reference signal group corresponding to the each type of uplink signal.

Each type of uplink signal among the E types of uplink signals may be at least one of: a data channel, a control channel or a measurement reference signal.

In an embodiment, the method further includes at least one of the features described below.

The E downlink reference signal groups belong to one downlink component carrier.

The E time advance information groups correspond to one downlink component carrier.

The one downlink reference signal group includes at least one downlink reference signal, and each of the at least one downlink reference signal includes at least one of: a downlink measurement reference signal for tracking, a downlink synchronization signal or a downlink measurement reference signal.

In an embodiment, the method further includes at least one of the features described below.

The one downlink component carrier corresponds to E downlink frame timings.

The one uplink component carrier corresponds to E uplink frame timings.

The E types of uplink signals correspond to at least one of: E control resource groups, E frequency domain bandwidth part groups, E pieces of channel configuration information or E pieces of parameter set configuration information.

In an embodiment, at least one of the following is determined according to at least one of signaling information or a predetermined rule:
 a correspondence between one component carrier and the E time advance information groups;
 a correspondence between one component carrier and the E downlink reference signal groups; or
 a correspondence between the E time advance information groups and the E downlink reference signal groups.

The one component carrier includes at least one of the one uplink component carrier or one downlink component carrier.

The signal reception method in the embodiment is illustrated in conjunction with the examples described below.

Example Seven

Figure 9:
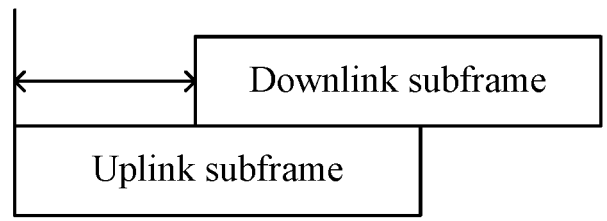
FIG. 9 is a diagram showing a time advance of an uplink subframe corresponding to a type of uplink signal relative to a downlink subframe according to an embodiment of the present disclosure.
Figure 10:
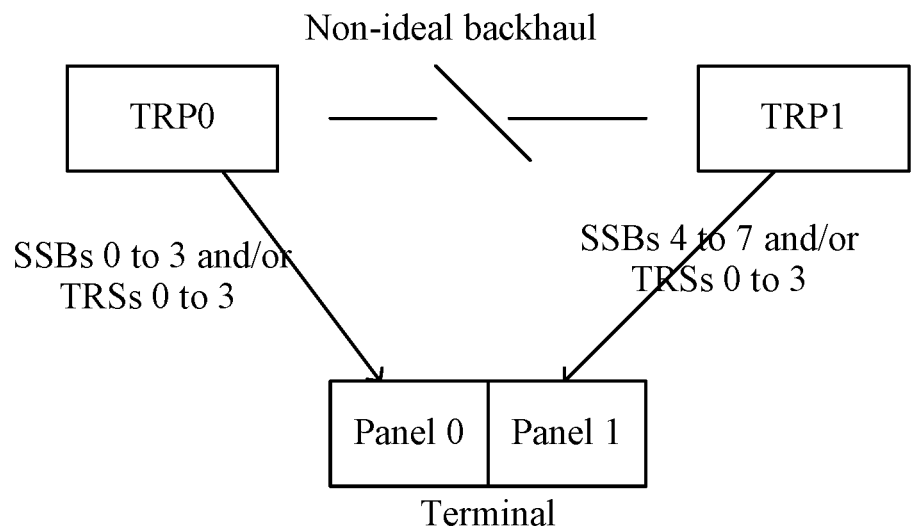
FIG. 10 is a diagram showing communication between a plurality of TRPs and a same terminal according to an embodiment of the present disclosure.

As shown in FIG. 9, an uplink subframe has a time advance relative to a downlink subframe. When a plurality of TRPs serve the same terminal, especially when the plurality of TRPs are physically located relatively far from each other, the downlink timings of the plurality of TRPs arriving at the terminal are different, and the uplink signal sent by the terminal to each TRP is to be obtained according to the downlink timing corresponding to the each TRP. As shown in FIG. 10, each TRP corresponds to a group of synchronization signal/physical broadcast channel blocks (SS/PBCH blocks, SSBs) or a group of tracking reference signals (TRSs).

The plurality of TRPs transmit at least one of a plurality of types of downlink data channels, a plurality of types of downlink control channels or a plurality of types of downlink measurement reference signals to the same terminal on the same time-frequency resources. The same terminal transmits at least one of a plurality of types of uplink data channels, a plurality of types of uplink control channels or a plurality of types of uplink measurement reference signals to different TRPs on the same time-frequency resources. One TRP correspond to at least one of a type of data channel (including at least one of an uplink data channel or a downlink data channel), a control channel (including at least one of an uplink control channel or a downlink control channel) or a measurement reference signal (including at least one of an uplink measurement reference signal or a downlink measurement reference signal).

From the description of the preceding embodiment, it will be apparent to those skilled in the art that the method in the preceding embodiment may be implemented by software plus a necessary general-purpose hardware platform or may of course be implemented by hardware. However, in many cases, the former is a preferred implementation. Based on this understanding, the technical solutions provided by the present disclosure substantially, or the part contributing to the related art, may be embodied in the form of a software product. The computer software product is stored in a storage medium (such as a read-only memory (ROM)/ random access memory (RAM), a magnetic disk or an optical disk) and includes several instructions for enabling a terminal device (which may be a mobile phone, a computer, a server, a network device or the like) to execute the method according to each embodiment of the present disclosure.

Embodiment Two

The embodiment further provides an information determination apparatus. The apparatus is configured to implement the preceding embodiments and implementations. What has been described will not be repeated. As used below, the term "module" may be software, hardware, or a combination thereof capable of implementing predetermined functions. The apparatus in the embodiment described below is preferably implemented by software, but an implementation by hardware or by a combination of software and hardware is also possible and conceivable.

Figure 11:
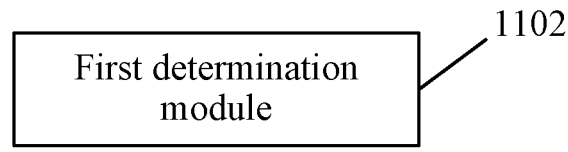
FIG. 11 is a block diagram showing structures of an information determination apparatus according to an embodiment of the present disclosure.

FIG. 11 is a block diagram showing structures of an information determination apparatus according to an embodiment of the present disclosure. As shown in FIG. 11, the apparatus includes a first determination module 1102.

The first determination module 1102 is configured to determine quasi-co-location reference signal information of an aperiodic measurement reference signal resource according to first information. The first information includes at least one of: a relationship between a first threshold and a time interval, whether an intersection is null, a time offset or a predetermined rule.

The time interval includes one of: a time interval between control information scheduling the aperiodic measurement reference signal resource and the aperiodic measurement reference signal resource or a time interval between control information scheduling the aperiodic measurement reference signal resource and an aperiodic measurement reference signal resource set including the aperiodic measurement reference signal resource.

The intersection is an intersection of a first time domain symbol set and a second time domain symbol set. The first time domain symbol set includes one of: a time domain symbol set where the aperiodic measurement reference signal resource is located or a time domain symbol set where the aperiodic measurement reference signal resource set including the aperiodic measurement reference signal resource is located. The second time domain symbol set is a time domain symbol set where a target channel or a target signal is located.

The time offset is a time offset associated with the aperiodic measurement reference signal resource set including the aperiodic measurement reference signal resource.

The apparatus further includes a second determination module (not shown in FIG. 11). The second determination module is connected to the first determination module 1102 and configured to determine the first threshold according to second information. The second information includes at least one of the following:

signaling information which includes information about the first threshold;

first capability information reported by a communication node, where the first capability information is used for indicating a minimum time interval required by the communication node to detect physical layer control information and apply spatial domain quasi-co-location reference signal information indicated in the physical layer control information for receiving a data channel;

second capability information reported by a communication node, where the second capability information is used for indicating a minimum time interval required by the communication node between a time of physical layer control information and a time when spatial domain quasi-co-location reference signal information indicated in the physical layer control information is used to receive the aperiodic measurement reference signal;

third capability information reported by a communication node, where the third capability information is used for indicating: in a case where the aperiodic measurement reference signal is received by using an inactive antenna, a minimum time interval required by the communication node from a time when the communication node detects physical layer control information to a time when spatial domain quasi-co-location reference signal information indicated in the physical layer control information is used to receive the aperiodic measurement reference signal;

fourth capability information reported by a communication node, where the fourth capability information is used for indicating: when the communication node receives an aperiodic measurement reference signal, a minimum time interval between the aperiodic measurement reference signal and physical layer control information scheduling the aperiodic measurement reference signal;

whether a value of fifth capability information reported by a communication node belongs to a predetermined set, where the fifth capability information includes one of second capability information, third capability information or fourth capability information;

information about an activation state of a receive antenna of a communication node;

information about a reception parameter associated with the aperiodic measurement reference signal resource;

group information associated with the aperiodic measurement reference signal resource;

whether the intersection is null;

whether it is in an active state in a discontinuous reception period;

information about an activation state of a receive antenna associated with the aperiodic measurement reference signal resource;

whether a data channel exists in a time domain symbol or at a time moment where the aperiodic measurement reference signal resource is located;

configuration information of the aperiodic measurement reference signal set where the aperiodic measurement reference signal resource is located;

set index information of the aperiodic measurement reference signal set where the aperiodic measurement reference signal resource is located; or resource index information of the aperiodic measurement reference signal resource.

The communication node is a reception node of an aperiodic measurement reference signal carried by the aperiodic measurement reference signal resource.

The first threshold has a first characteristic, and the first characteristic includes at least one of the following:

the first threshold is configured in an aperiodic measurement reference signal set;

at least two aperiodic measurement reference signal sets exist, where two aperiodic measurement reference signal sets correspond to different first thresholds;

in a case where the intersection is null, the first threshold is a first value;

in a case where the intersection is not null, the first threshold is a second value;

the first threshold is acquired according to parameter information associated with the aperiodic measurement reference signal resource, where the parameter information includes at least one of: quasi-co-location reference signal information of the aperiodic measurement reference signal resource or a configuration situation of a spatial transmission parameter in the aperiodic measurement reference signal resource set including the aperiodic measurement reference signal resource;

in a case where the value of the fifth capability information reported by the communication node belongs to the predetermined set, the first threshold is the value of the fifth capability information reported by the communication node; or in a case where the value of the fifth capability information reported by the communication node does not belong to the predetermined set, the first threshold is a value of the first capability information reported by the communication node.

The first value and the second value satisfy one of the following: the first value and the second value are two different values or the first value is less than the second value.

The predetermined set includes time intervals of {14 time domain symbols, 28 time domain symbols, 48 time domain symbols}.

The first determination module 1102 includes a determination unit (not shown in FIG. 11). The determination unit is configured to: in a case where the first information includes the time offset, determine the quasi-co-location reference signal information of the aperiodic measurement reference signal resource according to the time offset and a fourth predetermined rule. The fourth predetermined rule includes at least one of the rules described below.

In a case where C aperiodic measurement reference signal resource sets correspond to a same time offset, quasi-co-location reference signals of one aperiodic measurement reference signal resource index in C aperiodic reference signal sets are the same.

In a case where C aperiodic measurement reference signal resource sets correspond to a same time offset, quasi-co-location reference signals of one aperiodic measurement reference signal resource index in C aperiodic reference signal sets satisfy a quasi-co-location relationship.

In a case where C aperiodic measurement reference signal resource sets correspond to a same time offset, one aperiodic measurement reference signal resource index is configured with no quasi-co-location reference signal in all of the C aperiodic reference signal sets.

In a case where C aperiodic measurement reference signal resource sets correspond to different time offsets, quasi-co-location reference signals of one aperiodic measurement reference signal resource index in C aperiodic reference signal sets are the same or different.

One aperiodic measurement reference signal resource index is not capable of being configured with more than one set of quasi-co-location reference signals in one trigger state.

One aperiodic measurement reference signal resource index is not capable of being configured with more than one set of quasi-co-location reference signals in one aperiodic measurement reference signal set.

Each of the C aperiodic measurement reference signal resource sets includes the one aperiodic measurement reference signal resource index, and in response to the C aperiodic measurement reference signal resource sets corresponding to one trigger state, C is an integer value greater than 1.

Figure 12:
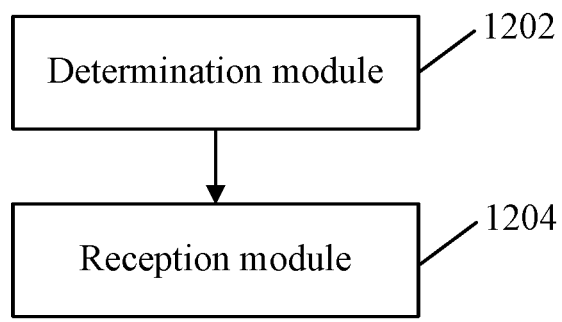
FIG. 12 is a block diagram showing structures of a signal reception apparatus according to an embodiment of the present disclosure.

The embodiment further provides a signal reception apparatus. FIG. 12 is a block diagram showing structures of a signal reception apparatus according to an embodiment of the present disclosure. As shown in FIG. 12, the apparatus includes a determination module 1202 and a reception module 1204.

The determination module 1202 is configured to determine parameter information of a measurement reference signal according to a predetermined rule.

The reception module 1204 is connected to the determination module 1202 and configured to receive the measurement reference signal according to the determined parameter information.

The measurement reference signal is an aperiodic measurement reference signal, and the predetermined rule includes acquiring, according to third information, time offset information of an aperiodic measurement reference signal resource where the aperiodic measurement reference signal is located. The third information includes at least one of the following:

quasi-co-location reference signal information of the aperiodic measurement reference signal resource;

a value of capability information reported by a communication node;

an aperiodic measurement reference signal resource index;

a set index of an aperiodic measurement reference signal resource set including the aperiodic measurement reference signal resource;

an activation state of a reception resource associated with the aperiodic measurement reference signal resource;

a decision result of whether a time domain symbol position of the aperiodic measurement reference signal resource is within a predetermined range;

a decision result of whether combined configuration information of a time domain symbol position of the aperiodic measurement reference signal resource and a time offset in a resource set where the aperiodic measurement reference signal resource is located satisfies a predetermined condition;

first threshold information corresponding to a resource set where the aperiodic measurement reference signal resource is located;

a decision result of whether a value of capability information reported by a communication node belongs to a predetermined set;

a decision result of whether time offset information is configured in an aperiodic measurement reference signal resource set; or a configuration situation of a spatial transmission parameter in an aperiodic measurement reference signal resource set.

In response to no time offset information being configured in an aperiodic measurement reference signal resource set, a time offset of the aperiodic measurement reference signal resource is a predetermined value, where the predetermined value is the value of the capability information reported by the communication node.

In response to the third information satisfying a predetermined characteristic, the time offset is capability information reported by the communication node.

The predetermined set includes {16 time units, 24 time units}.

The measurement reference signal is an aperiodic measurement reference signal and the predetermined rule includes at least one of the rules described below.

In a case where C aperiodic measurement reference signal resource sets correspond to a same time offset, quasi-co-location reference signals of one aperiodic measurement reference signal resource index in C aperiodic reference signal sets are the same.

In a case where C aperiodic measurement reference signal resource sets correspond to a same time offset, quasi-co-location reference signals of one aperiodic measurement reference signal resource index in C aperiodic reference signal sets satisfy a quasi-co-location relationship.

In a case where C aperiodic measurement reference signal resource sets correspond to a same time offset, one aperiodic measurement reference signal resource index is configured with no quasi-co-location reference signal in all of the C aperiodic reference signal sets.

In a case where C aperiodic measurement reference signal resource sets correspond to a same time offset, one aperiodic measurement reference signal resource index is configured with a quasi-co-location reference signal in each of the C aperiodic measurement reference signal resource sets.

In a case where C aperiodic measurement reference signal resource sets correspond to different time offsets, quasi-co-location reference signals of one aperiodic measurement reference signal resource index in C aperiodic reference signal sets are the same or different.

Quasi-co-location reference signals of aperiodic measurement reference signal resources having a same resource index and belonging to a same component carrier at a same time moment have a same configuration.

Aperiodic measurement reference signal resources having a same resource index and belonging to a same component carrier at a same time moment have a same parameter configuration.

Aperiodic measurement reference signal resources having a same resource index and belonging to a same component carrier at a same time moment are not capable of being associated with more than one quasi-co-location reference signal.

Configuration information of frequency domain bandwidth parts in a set of a plurality of measurement reference signal resource sets where a same aperiodic measurement reference signal resource index is located is the same.

One aperiodic measurement reference signal resource is at least in one set of aperiodic measurement reference signal sets and/or at least of a predetermined type.

One aperiodic measurement reference signal resource is included at least in one set of aperiodic measurement reference signal sets.

One aperiodic measurement reference signal resource index is not capable of being configured with more than one set of quasi-co-location reference signals in one trigger state.

One aperiodic measurement reference signal resource index is not capable of being configured with more than one set of quasi-co-location reference signals in one aperiodic measurement reference signal set.

One aperiodic measurement reference signal resource index is capable of being associated with merely one aperiodic measurement reference signal set in one trigger state.

One aperiodic measurement reference signal resource index is not capable of being triggered for a plurality of times in one trigger state.

One aperiodic measurement reference signal resource index is capable of being associated with merely one time offset in one trigger state.

Each of the C aperiodic measurement reference signal resource sets includes the one aperiodic measurement reference signal resource index, the C aperiodic measurement reference signal resource sets correspond to one trigger state, and C is a positive integer greater than 1.

The predetermined rule includes at least one of the rules described below.

In a case where a measurement reference signal resource is of a predetermined type, a frequency domain bandwidth part of the measurement reference signal resource is D frequency domain bandwidth parts, where D is a positive integer greater than or equal to 1.

In a case where a measurement reference signal resource is of a predetermined type, an intersection of a frequency domain resource configured in a measurement reference signal resource and a frequency domain resource included in each frequency domain bandwidth part in one frequency domain bandwidth part set is not null.

In a set of a plurality of measurement reference signal resource sets where one measurement reference signal resource index is located, configuration information of a frequency domain bandwidth part of each of the plurality of measurement reference signal resource sets is the same.

One measurement reference signal resource index is associated with information about merely one frequency domain bandwidth part in one component carrier.

One measurement reference signal resource is included at least in one set of measurement reference signal resource sets.

In a case where a measurement reference signal resource is configured in spatial filtering parameter information of a transmitted signal, the spatial filtering parameter information includes information about a frequency domain bandwidth part where the measurement reference signal resource is located.

The determination module 1202 includes a value taking unit.

The value taking unit (not shown in FIG. 12) is configured to: in a case where a first-type parameter of a measurement reference signal is not configured, take a predetermined value for the first-type parameter of the measurement reference signal.

Figure 13:
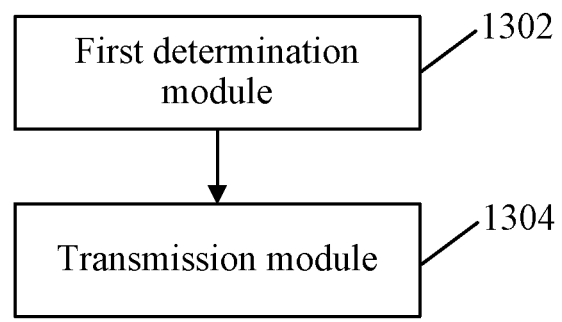
FIG. 13 is a block diagram showing structures of a signal transmission apparatus according to an embodiment of the present disclosure.

The embodiment further provides a signal transmission apparatus. FIG. 13 is a block diagram showing structures of a signal transmission apparatus according to an embodiment of the present disclosure. As shown in FIG. 13, the apparatus includes a first determination module 1302 and a transmission module 1304.

The first determination module 1302 is configured to determine at least one of one downlink reference signal group or one time advance information group corresponding to each type of uplink signal among E types of uplink signals comprised in one uplink component carrier. The E types of uplink signals correspond to at least one of E downlink reference signal groups or E time advance information groups, and E is a positive integer greater than or equal to 1.

The transmission module 1304 is connected to the first determination module 1302 and configured to transmit at least one type of uplink signal among the E types of uplink signals according to at least one of the determined one downlink reference signal group or the determined one time advance information group.

The apparatus further includes a second determination module.

The second determination module (not shown in FIG. 13) is connected to the first determination module 1302 and configured to determine at least one of the following according to at least one of signaling information or a predetermined rule:

a correspondence between one component carrier and the E time advance information groups;

a correspondence between one component carrier and the E downlink reference signal groups; or a correspondence between the E time advance information groups and the E downlink reference signal groups.

The one component carrier includes at least one of the one uplink component carrier or one downlink component carrier.

It is to be noted that the various modules described above may be implemented by software or hardware. An implementation by hardware may, but may not necessarily, be performed in the following manners: the various modules described above are located in the same processor, or the various modules described above are located in their respective processors in any combination form.

Embodiment Three

The embodiments of the present disclosure further provide a storage medium. The storage medium stores a computer program. When the computer program is executed, the steps in any one of preceding method embodiments are performed.

In the embodiment, the storage medium may be configured to store the computer program for performing the step described below.

In S1, quasi-co-location reference signal information of an aperiodic measurement reference signal resource is determined according to first information. The first information includes at least one of: a relationship between a first threshold and a time interval, whether an intersection is null, a time offset or a predetermined rule. The time interval includes one of: a time interval between control information scheduling the aperiodic measurement reference signal resource and the aperiodic measurement reference signal resource or a time interval between control information scheduling the aperiodic measurement reference signal resource and an aperiodic measurement reference signal resource set including the aperiodic measurement reference signal resource.

The intersection is an intersection of a first time domain symbol set and a second time domain symbol set. The first time domain symbol set includes one of: a time domain symbol set where the aperiodic measurement reference signal resource is located or a time domain symbol set where the aperiodic measurement reference signal resource set including the aperiodic measurement reference signal resource is located. The second time domain symbol set is a time domain symbol set where a target channel or a target signal is located.

The time offset is a time offset associated with the aperiodic measurement reference signal resource set including the aperiodic measurement reference signal resource.

In the embodiment, the storage medium may further be configured to store the computer program for performing the steps described below.

In S1, parameter information of a measurement reference signal is determined according to a predetermined rule.

In S2, the measurement reference signal is received according to the determined parameter information.

In the embodiment, the storage medium may further be configured to store the computer program for performing the steps described below.

In S1, at least one of one downlink reference signal group or one time advance information group corresponding to each type of uplink signal among E types of uplink signals comprised in one uplink component carrier is determined. The E types of uplink signals correspond to at least one of E downlink reference signal groups or E time advance information groups, and E is a positive integer greater than or equal to 1.

In S2, at least one type of uplink signal among the E types of uplink signals is transmitted according to at least one of the determined one downlink reference signal group or the determined one time advance information group.

In the embodiment, the storage medium may include, but is not limited to, a USB flash drive, a read-only memory (ROM), a random access memory (RAM), a mobile hard disk, a magnetic disk, an optical disk or another medium capable of storing a computer program.

The embodiments of the present disclosure further provide an electronic apparatus which includes a memory and a processor. The memory stores a computer program, and the processor is configured to execute the computer program to perform the steps in any one of the preceding method embodiments.

The electronic apparatus may further include a transmission device and an input/output device. Both the transmission device and the input/output device are connected to the processor.

In the embodiment, the processor may be configured to perform steps described below through the computer program.

In S1, quasi-co-location reference signal information of an aperiodic measurement reference signal resource is determined according to first information. The first information includes at least one of: a relationship between a first threshold and a time interval, whether an intersection is null, a time offset or a predetermined rule.

The time interval includes one of: a time interval between control information scheduling the aperiodic measurement reference signal resource and the aperiodic measurement reference signal resource or a time interval between control information scheduling the aperiodic measurement reference signal resource and an aperiodic measurement reference signal resource set including the aperiodic measurement reference signal resource.

The intersection is an intersection of a first time domain symbol set and a second time domain symbol set. The first time domain symbol set includes one of: a time domain symbol set where the aperiodic measurement reference signal resource is located or a time domain symbol set where the aperiodic measurement reference signal resource set including the aperiodic measurement reference signal resource is located. The second time domain symbol set is a time domain symbol set where a target channel or a target signal is located.

The time offset is a time offset associated with the aperiodic measurement reference signal resource set including the aperiodic measurement reference signal resource.

In the embodiment, the processor may further be configured to perform steps described below through the computer program.

In S1, parameter information of a measurement reference signal is determined according to a predetermined rule.

In S2, the measurement reference signal is received according to the determined parameter information.

In the embodiment, the processor may further be configured to perform steps described below through the computer program.

In S1, at least one of one downlink reference signal group or one time advance information group corresponding to each type of uplink signal among E types of uplink signals comprised in one uplink component carrier is determined. The E types of uplink signals correspond to at least one of E downlink reference signal groups or E time advance information groups, and E is a positive integer greater than or equal to 1.

In S2, at least one type of uplink signal among the E types of uplink signals is transmitted according to at least one of the determined one downlink reference signal group or the determined one time advance information group.

For specific examples in the embodiment, reference may be made to the examples described in the preceding embodiments and implementations, and the examples will not be repeated in the embodiment.

Apparently, it should be understood by those skilled in the art that each of the preceding modules or steps of the present disclosure may be implemented by a general-purpose computing apparatus, the modules or steps may be concentrated on a single computing apparatus or distributed on a network composed of multiple computing apparatuses, and optionally, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this manner, the present disclosure is not limited to any specific combination of hardware and software.

We claim:

1. An information determination method, comprising:
   determining quasi-co-location reference signal information of an aperiodic measurement reference signal resource according to first information, wherein the first information comprises:
   a relationship between a first threshold and a time interval, and an intersection is not null,
   wherein the time interval comprises a time interval between control information scheduling the aperiodic measurement reference signal resource and the aperiodic measurement reference signal resource; and
   wherein the intersection is an intersection of a first time domain symbol set and a second time domain symbol set, and the first time domain symbol set comprises: a time domain symbol set where the aperiodic measurement reference signal resource is located; and the second time domain symbol set is a time domain symbol set where a target channel or a target signal is located; and
   determining the first threshold according to second information, wherein the second information comprises:
   fourth capability information reported by a communication node, wherein the fourth capability information is used for indicating a minimum time interval between the aperiodic measurement reference signal and physical layer control information scheduling the aperiodic measurement reference signal;
   a value of the fourth capability information belongs to a predetermined set; and
   configuration information of the aperiodic measurement reference signal resource set including the aperiodic measurement reference signal resource.

2. The method of claim 1, wherein the first threshold is acquired according to parameter information associated with the aperiodic measurement reference signal resource, wherein the parameter information comprises a configuration situation of a spatial transmission filtering parameter of the aperiodic measurement reference signal resource set including the aperiodic measurement reference signal resource.

3. The method of claim 2, wherein the spatial transmission filtering parameter is configured as a repetition parameter.

4. The method of claim 2, wherein the first threshold is configured to be a first value when the aperiodic measurement reference signal resource is configured to be repetitive, and the first threshold is configured to be a second value when the aperiodic measurement reference signal resource is configured not to be repetitive, and wherein the first value is greater than the second value.

5. The method of claim 2, wherein the predetermined set comprises time intervals of {14 time domain symbols, 28 time domain symbols, 48 time domain symbols}.

6. The method of claim 1, wherein the target channel comprises a data channel, and the target signal comprises a measurement reference signal.

7. An electronic apparatus, comprising:
   a processor; and
   a memory configured to store a computer program;
   wherein when the computer program is executed, the processor is configured to:
   determine quasi-co-location reference signal information of an aperiodic measurement reference signal resource according to first information, wherein the first information comprises: a relationship between a first threshold and a time interval, and an intersection is not null, a time offset or a predetermined rule,
   wherein the time interval comprises one of: a time interval between control information scheduling the aperiodic measurement reference signal resource and the aperiodic measurement reference signal resource; and
   wherein the intersection is an intersection of a first time domain symbol set and a second time domain symbol set, and the first time domain symbol set comprises: a time domain symbol set where the aperiodic measurement reference signal resource is located; and the second time domain symbol set is a time domain symbol set where a target channel or a target signal is located: and determine the first threshold according to second information, wherein the second information comprises:

fourth capability information reported by a communication node, wherein the fourth capability information is used for indicating a minimum time interval between the aperiodic measurement reference signal and physical layer control information scheduling the aperiodic measurement reference signal;

a value of fifth capability information reported by a communication node belongs to a predetermined set, wherein the fifth capability information comprises at least a portion of the fourth capability information; and configuration information of the aperiodic measurement reference signal resource set including the aperiodic measurement reference signal resource.

8. The electronic apparatus of claim 7, wherein the first threshold is acquired according to parameter information associated with the aperiodic measurement reference signal resource, wherein the parameter information comprises a configuration situation of a spatial transmission filtering parameter of the aperiodic measurement reference signal resource set including the aperiodic measurement reference signal resource.

9. The electronic apparatus of claim 8, wherein the spatial transmission filtering parameter is configured as a repetition parameter.

10. The electronic apparatus of claim 8, wherein the first threshold is configured to be a first value when the aperiodic measurement reference signal resource is configured to be repetitive, and the first threshold is configured to be a second value when the aperiodic measurement reference signal resource is configured not to be repetitive, and wherein the first value is greater than the second value.

11. The electronic apparatus of claim 8, wherein the predetermined set comprises time intervals of {14 time domain symbols, 28 time domain symbols, 48 time domain symbols}.

12. The electronic apparatus of claim 7, wherein the target channel comprises a data channel, and the target signal comprises a measurement reference signal.

* * * * *